(12) United States Patent
Hiratsuka et al.

(10) Patent No.: US 9,261,739 B2
(45) Date of Patent: Feb. 16, 2016

(54) LIQUID CRYSTAL DISPLAY DEVICE

(75) Inventors: Takato Hiratsuka, Chiba (JP); Osamu Itou, Hitachi (JP); Shinichiro Oka, Hitachi (JP); Shinichi Komura, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 82 days.

(21) Appl. No.: 13/430,762

(22) Filed: Mar. 27, 2012

(65) Prior Publication Data

US 2012/0257156 A1 Oct. 11, 2012

(30) Foreign Application Priority Data

Apr. 5, 2011 (JP) ................................. 2011-083815

(51) Int. Cl.
*G02F 1/1343* (2006.01)
(52) U.S. Cl.
CPC .... *G02F 1/134363* (2013.01); *G02F 2201/122* (2013.01)
(58) Field of Classification Search
CPC ................. G02F 1/133707; G02F 1/134363
USPC ........................................................ 349/143
See application file for complete search history.

(56) References Cited

U.S. PATENT DOCUMENTS

| | | | | |
|---|---|---|---|---|
| 6,593,988 | B1 * | 7/2003 | Liu et al. | 349/129 |
| 7,675,596 | B2 * | 3/2010 | Hirota et al. | 349/134 |
| 2001/0007487 | A1 * | 7/2001 | Yoon et al. | 349/106 |
| 2005/0007536 | A1 * | 1/2005 | Hirakata et al. | 349/143 |
| 2005/0152230 | A1 * | 7/2005 | Konno et al. | 369/1 |
| 2006/0215100 | A1 * | 9/2006 | Ito | 349/141 |
| 2007/0194322 | A1 * | 8/2007 | Sung et al. | 257/72 |
| 2007/0216842 | A1 * | 9/2007 | Kawasaki et al. | 349/141 |

FOREIGN PATENT DOCUMENTS

| | | |
|---|---|---|
| CN | 1527113 | 9/2004 |
| CN | 1892328 | 1/2007 |
| JP | 6-214244 | 8/1994 |

OTHER PUBLICATIONS

Office Action in corresponding foreign Chinese Patent Application No. 201210101568.3, dated Jun. 10, 2014, English translation thereof.

* cited by examiner

*Primary Examiner* — Paisley L Arendt
*Assistant Examiner* — Edmond Lau
(74) *Attorney, Agent, or Firm* — Lowe Hauptman & Ham, LLP

(57) ABSTRACT

A liquid crystal display device includes a first substrate provided with first and second electrodes, and a second substrate disposed to be opposite to the first substrate via a liquid crystal layer. Regions of pixels each having the first and second electrodes are arranged in a matrix, and the liquid crystal layer is driven by an electric field in an in-plane direction of the first substrate, applied between the first and second electrodes. A step difference is formed at an opposite side of the first substrate for each of the pixel regions. The first or second electrode includes a wall-shaped electrode formed at a side wall surface of the step difference and a planar electrode formed from an edge of the wall-shaped electrode along the main surface of the first substrate. The wall-shaped electrode and the planar electrode are electrically connected to each other.

12 Claims, 24 Drawing Sheets

LIQUID CRYSTAL DISPLAY DEVICE

CROSS-REFERENCE TO RELATED APPLICATION

The present application claims priority from Japanese application JP 2011-083815 filed on Apr. 5, 2011, the contents of which are hereby incorporated by reference into this application.

BACKGROUND OF THE INVENTION

1. Field of the Invention

The present invention relates to a liquid crystal display device, and more particularly to an active matrix type liquid crystal display device.

2. Description of the Related Art

In recent years, performance of the liquid crystal display device has been increasingly improved, and thus there is a demand for products capable of performing WVGA display of 800×480 pixels even in small and medium-size liquid crystal display devices of 3 to 4 inches. However, in small and medium-size liquid crystal panels capable of performing the WVGA display, since plural display pixels (hereinafter, simply referred to as pixels) are required to be formed in a limited display region, the width of a single pixel width is about 30 μm. For this reason, there is a demand for further improvement in aperture ratio or improvement in display mode efficiency.

As a liquid crystal display device where the display mode efficiency is improved, there is a liquid crystal display device disclosed in, for example, JP 6-214244 A. In the liquid crystal display device disclosed in JP 6-214244 A, a pair of electrodes are formed at both ends of the pixel region, an image signal is supplied to one electrode (source electrode), and a common signal used as a reference is supplied to the other electrode (common electrode), thereby generating an electric field (a so-called horizontal electric field) parallel to the main surface of the liquid crystal display panel and driving liquid crystal molecules. Particularly, in the liquid crystal display device disclosed in JP 6-214244 A, the source electrode and the common electrode are formed in a wall shape so as to protrude toward the second substrate from the main surface of the first substrate, and the extending direction thereof is perpendicular to the main surface of the first substrate. With this configuration, in the liquid crystal display device disclosed in JP 6-214244 A, the density of the electric flux lines is the same from a region close to the first substrate to a distant region (a region close to the second substrate), and thereby display mode efficiency is improved.

On the other hand, in the small and medium-size liquid crystal display panels capable of performing the WVGA display, in order to improve the aperture ratio, the interval between the adjacent pixels becomes very small, and thus an interval between the source electrode of each pixel and the common electrode of the adjacent pixel also becomes very small. For this reason, in the liquid crystal display device disclosed in JP 6-214244 A, for example, in a region where a pixel performing white display and a pixel performing black display are adjacent to each other, the interval between the source electrode of the pixel performing white display and the common electrode of the adjacent pixel performing black display becomes very small. As a result, the electric flux lines generated from the source electrode of the pixel performing white display head toward the common electrode in the pixel and also head toward the source electrode of the adjacent pixel performing black display. In this case, the density of the electric flux lines between the source electrode and the common electrode in the pixel performing white display is high in the vicinity of the source electrode formed in a wall shape and the common electrode, and is low in a part distant from each electrode. That is to say, there is concern that the electric field intensity is non-uniform in the pixel region, and thus the display mode efficiency is reduced.

In addition, there is concern that electric flux lines heading toward the electrode of the pixel performing black display from the source electrode of the pixel performing white display are generated, the liquid crystal molecules in the pixel region performing black display are driven by the electric flux lines, thus the transmittance during the black display is increased, and thereby a dynamic range is lowered.

Further, signal lines such as a drain line may be considered to be formed under each electrode in order to improve the aperture ratio, but there is also concern that the liquid crystal molecules are driven by electric flux lines heading toward each of adjacent electrodes from each signal line, and thus the transmittance is increased during the black display.

SUMMARY OF THE INVENTION

The present invention has been made in consideration of these problems, and an object of the present invention is to provide a liquid crystal display device capable of improving the display mode efficiency by making electric field distribution in pixels uniform.

In order to solve these problems, there is provided a liquid crystal display device including a first substrate provided with a first electrode and a second electrode; and a second substrate disposed so as to be opposite to the first substrate via a liquid crystal layer, wherein regions of pixels each having the first electrode and the second electrode are arranged in a matrix, and the liquid crystal layer is driven by an electric field in an in-plane direction of the first substrate, applied between the first electrode and the second electrode, wherein a step difference is formed at an opposite side of the first substrate for each of the pixel regions, wherein the first electrode or/and the second electrode includes/include a wall-shaped electrode formed at a side wall surface of the step difference and a planar electrode formed from an edge of the wall-shaped electrode along the main surface of the first substrate, and wherein the wall-shaped electrode and the planar electrode are electrically connected to each other.

According to the present invention, it is possible to make the electric field distribution in each pixel uniform and to thereby improve display mode efficiency.

Other effects of the present invention will be apparent from the description of the overall specification.

DETAILED DESCRIPTION OF THE INVENTION

Figure 1:
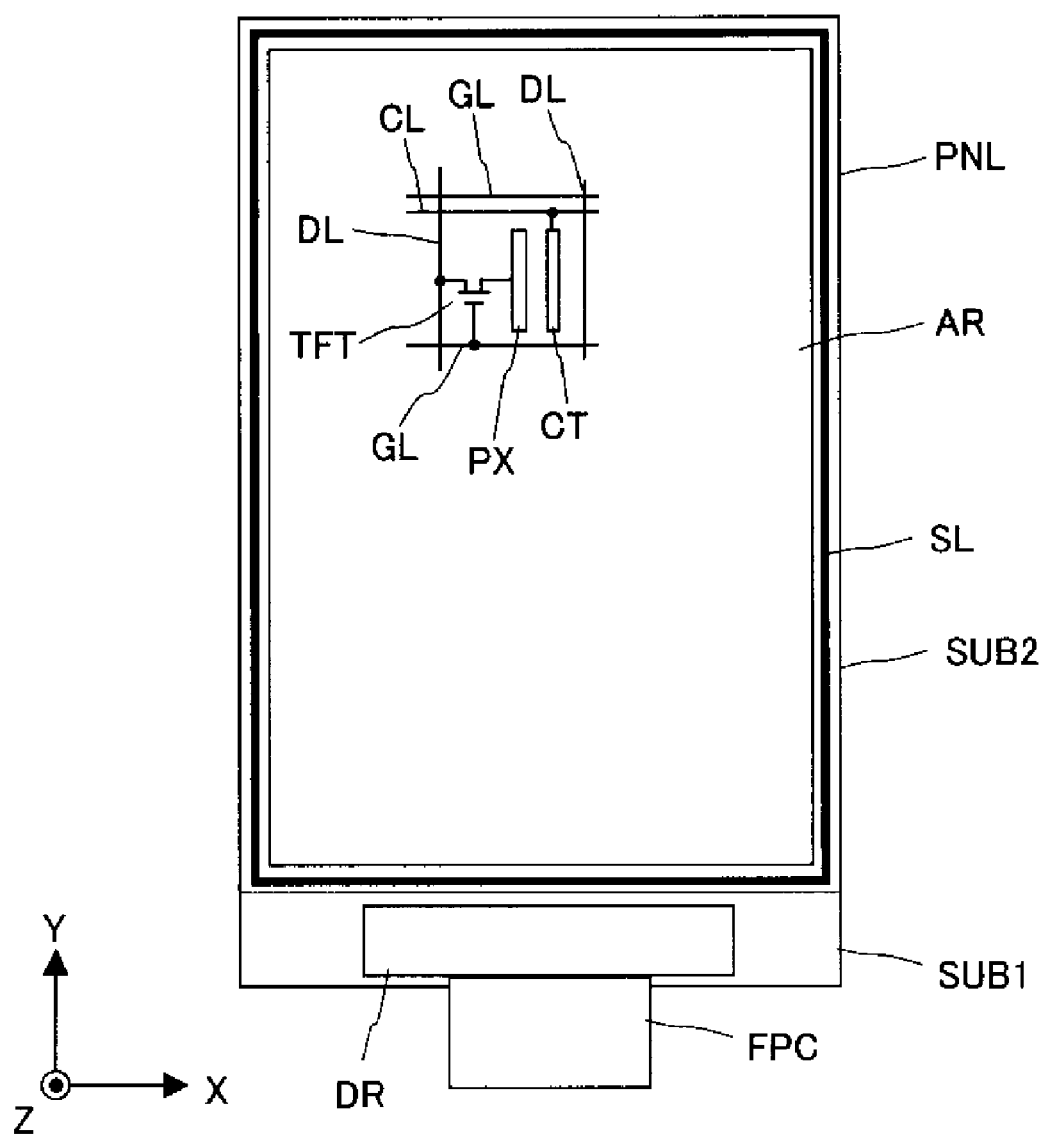
FIG. 1 is a diagram illustrating a pixel configuration of the liquid crystal display device according to a first embodiment of the present invention.

Hereinafter, embodiments of the present invention will be described with reference to the drawings. Here, in the following description, the same constituent elements are given the same reference numerals, and repeated description will be omitted. In addition, X, Y, and Z respectively indicate an X axis, a Y axis, and a Z axis.

[First Embodiment]
Overall Configuration

FIG. 1 is a diagram illustrating a pixel configuration of the liquid crystal display device according to a first embodiment of the present invention, and an overall configuration of the liquid crystal display device according to the first embodiment will be described with reference to FIG. 1. In addition, in the present specification, transmittance excluding influence of absorption by a color filter CF or polarizers POL1 and POL2 or influence of an aperture ratio is assumed as display mode efficiency. Therefore, when an oscillation direction of linearly polarized light emitted from the polarizer POL1 on the backlight unit side is incident to the polarizer POL2 on the display surface side, display mode efficiency in a case of being rotated by 90 degrees is assumed as 100%.

As shown in FIG. 1, the liquid crystal display device according to the first embodiment has a liquid crystal display panel PNL which includes a first substrate SUB1 provided with a pixel electrode (first electrode) PX and a thin film transistor TFT, a second substrate SUB2 disposed to be opposite to the first substrate SUB1 and provided with color filters and the like, and a liquid crystal layer interposed between the first substrate SUB1 and the second substrate SUB2. The liquid crystal display device is configured by a combination of the liquid crystal display panel PNL and a backlight unit (backlight device) (not shown) which is a light source of the liquid crystal display panel PNL. The first substrate SUB1 and the second substrate SUB2 are fixed to each other with seal materials SL which are coated on the edge of the second substrate in a ring shape, and the liquid crystal is also sealed. However, in the liquid crystal display device according to the first embodiment, of the regions in which the liquid crystal is sealed, a region in which display pixels (hereinafter, simply referred to as pixels) are formed is a display region AR. Therefore, even in the region where the liquid crystal is sealed, a region where the pixels are not formed and which is not related to display is not the display region AR.

In addition, the second substrate SUB2 has the area smaller than the first substrate SUB1, and exposes the lower side portion of the first substrate SUB1 in the figure. A driving circuit DR formed by semiconductor chips is mounted on the side portion of the first substrate SUB1. The driving circuit DR drives the pixels arranged in a display region AR. In addition, in the following description, there are cases where the liquid crystal display panel PNL is referred to as a liquid crystal display device. In relation to the first substrate SUB1 and the second substrate SUB2, for example, a well-known glass substrate is generally used as a base material; however, transparent resin insulating substrates may be used.

In the liquid crystal display device according to the first embodiment, in the display region AR corresponding to the surface of the first substrate SUB1 on the liquid crystal side, scanning signal lines (gate lines) GL, extending in the X direction of the figure and arranged in parallel to each other in the Y direction of FIG. 1, and supplied with scanning signals from the driving circuit DR, are formed. In addition, image signal lines (drain lines) DL, extending in the Y direction of the figure and arranged in parallel to each other in the X direction of FIG. 1, and supplied with image signals (grayscale signals) from the driving circuit, are formed. A region surrounded by two adjacent drain lines DL and two adjacent gate lines GL forms a pixel, and plural pixels are arranged in a matrix in the display region AR along the drain lines DL and the gate lines GL.

Each of the pixels includes, for example, as shown in FIG. 1, a thin film transistor TFT which is turned on and off by a scanning signal from the gate line GL, a pixel electrode PX which is supplied with an image signal from the drain line DL via a turned-on thin film transistor TFT, and a common electrode (second electrode) CT which is supplied with a common signal having a potential which is a reference with respect to a potential of the image signal, via a common line CL. In FIG. 1, the pixel electrode PX and the common electrode CT are schematically linearly illustrated, and configurations of the pixel electrode PX and the common electrode CT according to the first embodiment will be described in detail later. Here, the thin film transistor TFT according to the first embodiment is driven such that a drain electrode and a source electrode are changed due to a bias application; however, in the present specification, for convenience, an electrode connected to the drain line DL is a drain electrode, and an electrode connected to the pixel electrode PX is a source electrode.

An electric field having a component parallel to the main surface of the first substrate SUB1 is generated between the pixel electrode PX and the common electrode CT, and liquid crystal molecules are driven by the electric field. It is known that the liquid crystal display device can perform so-called wide viewing angle display, and the liquid crystal display device is called an IPS type or a horizontal electric field type because of the singularity of the application of an electric field to the liquid crystal. In addition, the liquid crystal display device with such a configuration performs display in a normally black display form where light transmittance is the minimum (black display) in a case where the electric field is not applied to the liquid crystal, and the light transmittance is gradually increased by applying the electric field.

Each of the drain lines DL and the gate lines GL extends over the seal material SL at its end portion and is connected to the driving circuit DR which generates driving signals such as image signals and scanning signals based on an input signal from an external system via a flexible printed board FPC. Although the liquid crystal display device according to the first embodiment has the configuration where the driving circuit DR is formed using semiconductor chips and is mounted on the first substrate SUB1, there may be a configuration where one or both of an image signal driving circuit for outputting image signals and a scanning signal driving circuit for outputting scanning signals are mounted on a flexible printed board FPC in a tape carrier type or a COF (Chip On Film) type so as to be connected to the first substrate SUB1.

Detailed Configuration of Pixel

Figure 2:
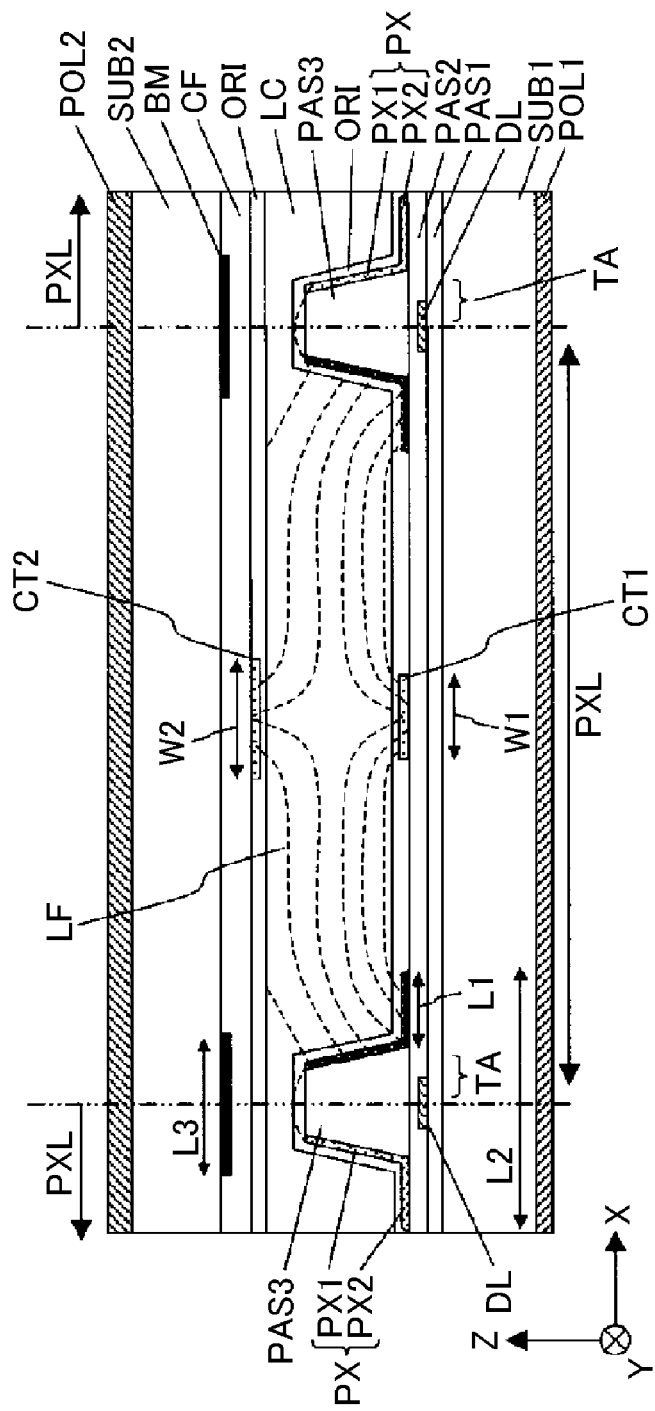
FIG. 2 is a cross-sectional view illustrating a pixel configuration of the liquid crystal display device according to the first embodiment of the present invention.
Figure 3:
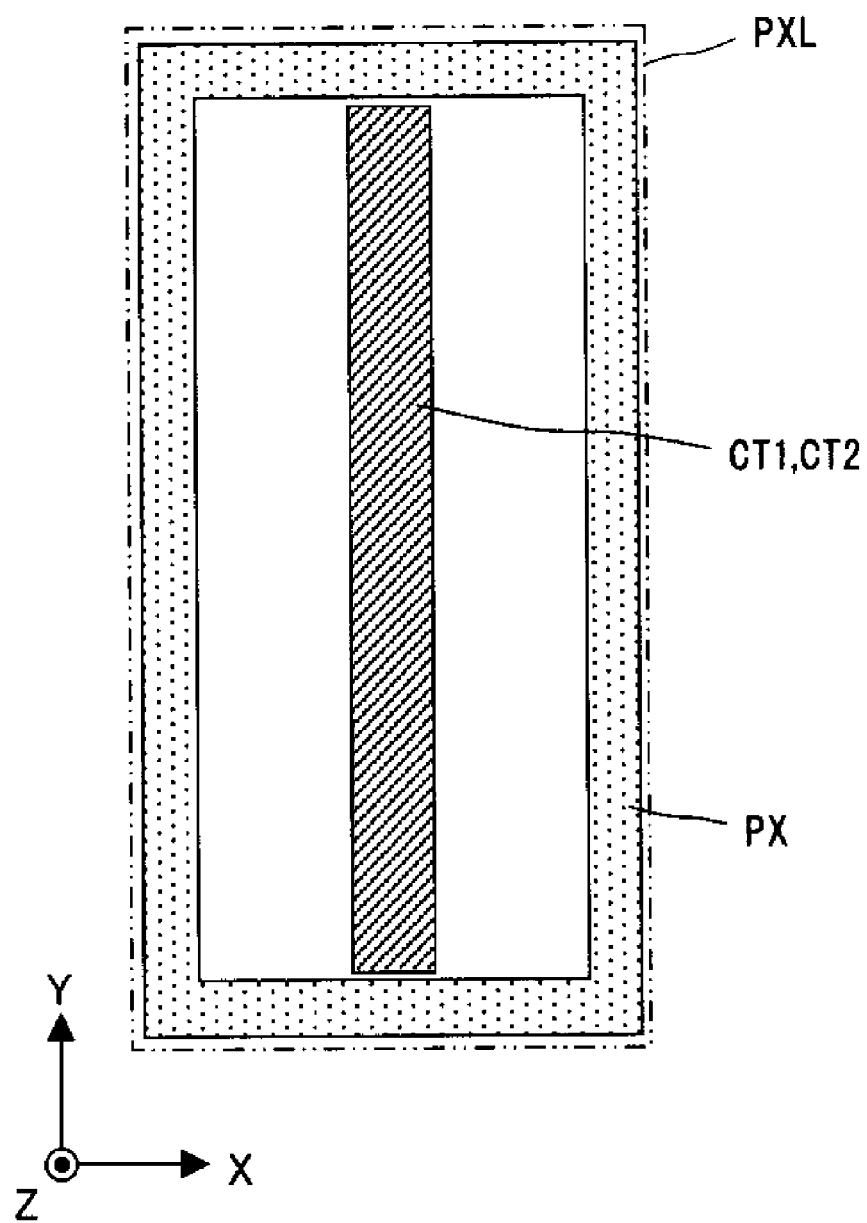
FIG. 3 is a plan view illustrating a configuration of the pixel electrode and the common electrode in the liquid crystal display device according to the first embodiment of the present invention.

FIG. 2 is a cross-sectional view illustrating a pixel configuration in the liquid crystal display device according to the first embodiment of the present invention, and FIG. 3 is a plan view illustrating the pixel electrode and the common electrode in the liquid crystal display device according to the first embodiment. Here, in the following description, although a case is described in which the pixel electrode PX is a wall-shaped electrode, and the common electrode CT is a pseudo-wall-shaped electrode where a pair of linear electrodes are formed, the common electrode CT may be a wall-shaped electrode, and the pixel electrode PX may be a pseudo-wall-shaped electrode.

As is clear from a positional relationship between the wall electrode (first electrode) PX and the linear electrodes (second electrodes) CT1 and CT2 for one pixel shown in FIG. 3, the pixel PXL in the liquid crystal display device according to the first embodiment includes the pixel electrode (wall electrode) PX formed at the peripheral portion of the pixel PXL, and the common electrode disposed in the pixel electrode PX and formed from a pair of linear electrodes CT1 and CT2. The wall electrode PX is formed so as to surround the boundary portion with adjacent pixels, indicated by the two-dot chain line, that is, the region of the pixel PXL along the peripheral portion of the pixel PXL. The linear electrodes CT1 and CT2 are formed in the longitudinal direction (the Y direction in the figure) of the pixel PXL.

Particularly, in the liquid crystal display device according to the first embodiment, an insulating layer PAS3 which is formed in a convex shape at the pixel boundary portion indicated by the two-dot chain line, and thereby a step difference is formed along the peripheral portion of the pixel PXL. A wall-shaped electrode PX1 is formed at the side wall surface of the step difference, that is, the side wall surface of the insulating layer PAS3, a planar electrode (first planar electrode) PX2 is consecutively formed from the wall-shaped electrode PX1 along the main surface of the first substrate SUB1, and the wall electrode PX is formed by the wall-shaped electrode PX1 and the planar electrode PX2. With this configuration, the annular wall-shaped electrode PX1 which stands (slant) from the main surface of the first substrate SUB1, that is, stands from the main surface of the first substrate SUB1 toward the side where the second substrate SUB2 is disposed, and the wall electrode PX is disposed so as to surround the region of the pixel PXL along the peripheral portion of the pixel PXL. In addition, the insulating layer PAS3 is formed at the boundary portion with adjacent pixels PXL, and thus is not limited to a transmissive insulating film material, and may be formed using a light blocking insulating film material as described later in detail.

At this time, as shown in the cross-sectional view of FIG. 2, the wall-shaped insulating layer PAS3 is formed exceeding the pixel boundary portion indicated by the two-dot chain line, and the planar electrode PX2 is formed extending in the in-plane direction of the main surface of the first substrate SUB1 from the end portion (edge) on the substrate surface side of the wall-shaped electrode PX1 formed at the side surface. In addition, a pair of linear electrodes CT1 and CT2 forming the common electrode CT are formed so as to overlap each other via the liquid crystal layer LC in the region between the wall electrodes PX disposed at both ends of the pixel PXL shown in FIG. 2.

In other words, in the liquid crystal display panel according to the first embodiment, the insulating layer PAS1 for insulating the gate insulating layer of the thin film transistor or the gate line from the drain line is formed on the opposite surface side which is one surface of the first substrate SUB1, and the drain lines DL are formed at the upper layer of the insulating layer PAS1. The insulating layer PAS2 for protecting the drain lines DL is formed on the drain lines DL, and the insulating layer PAS3 with a convex shape protruding toward the liquid crystal layer LC side is formed at the upper layer of the insulating layer PAS2. At this time, the thin film transistor TFT is formed in a region TA overlapping the formation region of the insulating layer PAS3, that is, the formation region of the wall electrode PX, and thereby the thin film transistor TFT is formed in a region where light is blocked by the black matrix (light blocking layer) BM, resulting in improving an aperture ratio of the pixels. However, the formation position of the thin film transistor TFT is not limited thereto, and may be other positions.

In addition, the planar electrode PX2 forming a part of the wall electrode PX which is the pixel electrode is formed at the upper layer of the insulating layer PAS2. The planar electrode PX2 is formed in an annular shape at the liquid crystal side surface of the insulating layer PAS2, and, particularly, the outer edge portion of the planar electrode PX2 is integrally connected to the peripheral portion on the lower side of the wall-shaped electrode PX1. That is to say, in the wall electrode PX according to the first embodiment, the peripheral portion on the lower side of the wall-shaped electrode PX1 formed in an annular shape extends with a predetermined width L1 on the insulating layer PAS2, thereby forming the planar electrode PX2. With this configuration, it is possible to prevent electric flux lines on the lower side of the wall-shaped electrode PX1 formed in an annular shape from turning around the lower side of the insulating layer PAS3, that is, the first substrate SUB1 side, and heading for the wall electrode PX of the adjacent pixel PXL. In addition, details thereof will be described later.

In addition, the linear electrode CT1 extending in the Y direction in the figure is formed on the insulating layer PAS2 in the middle of the pixels PXL in the figure in the X direction. In addition, the linear electrode CT2 forming a pair with the linear electrode CT1 is formed on the second substrate SUB2 side. The linear electrode CT1 and the linear electrode CT2 are formed so as to at least partially overlap each other in the in-plane direction of the liquid crystal display panel, that is, when viewed from the display surface side and the rear surface side, and are disposed so as to be opposite to each other via the liquid crystal layer LC. With this configuration, a potential applied to the liquid crystal layer LC in the region interposed between a pair of linear electrode CT1 and linear electrode CT2 is maintained at the same potential, and the common electrode (pseudo-wall electrode) CT is formed in which the same potential region forming the wall shape is a pseudo-wall electrode. At this time, since the liquid crystal molecules can be driven in the region where the region forming the pseudo-wall electrode CT, that is, the region where the linear electrodes CT1 and CT2 overlap each other, it is possible to prevent the display mode efficiency from being reduced in the region of the pseudo-wall electrode CT. In addition, details thereof will be described later.

On the other hand, in the surface of the second substrate SUB2 disposed so as to be opposite to the first substrate SUB1 via the liquid crystal layer LC, the black matrices BM which are a light blocking layer are formed on the opposite surface side which is a side of the liquid crystal layer LC. The black matrices BM are formed in the region between the adjacent pixels PXL in the same manner as the related art, and are formed in the X direction and Y direction along the peripheral portion of each of the pixels PXL. However, the black matrices BM may be formed only in the Y direction which is the extending direction of the drain lines DL.

In addition, a color filter CF corresponding to one of R (red), G (green), and B (blue) for each pixel PXL is formed on the opposite surface side of the second substrate SUB2, and thereby a unit pixel for color display is formed by the pixels PXL of RGB. Further, the linear electrode CT2 is formed at the upper layer of the color filter CF, and is formed at a position opposite to the linear electrode CT1 on the first substrate SUB1 via the liquid crystal layer LC. A well-known alignment layer ORI is formed at the upper layer of the color filter CF so as to cover the black matrices BM, the color filter CF, and the linear electrode CT2.

The polarizer POL1 is attached to the backlight unit side which is a rear surface side of the liquid crystal display panel PNL according to the first embodiment having the configuration, and the polarizer POL2 is attached to the display surface side.

In addition, although the planar electrode PX2 forming the wall electrode PX and the linear electrode CT1 are formed at the same layer in the first embodiment, for example, there may be other configurations where an insulation layer may be formed at the upper layer of the linear electrode CT1, and a wall electrode ST including the planar electrode PX2 may be formed at the upper layer of the insulating layer. In addition, the wall-shaped electrode PX1 and the planar electrode PX2 forming the wall electrode PX which is a pixel electrode and the linear electrodes CT1 and CT2 forming the pseudo-wall electrode CT which is a common electrode may be formed using a transparent conductive film material, for example, ITO (Indium Tin Oxide), AZO (Aluminum doped Zinc Oxide), GZO (Gallium doped Zinc Oxide), or the like.

Detailed Effects of Wall Electrode

Figure 4:
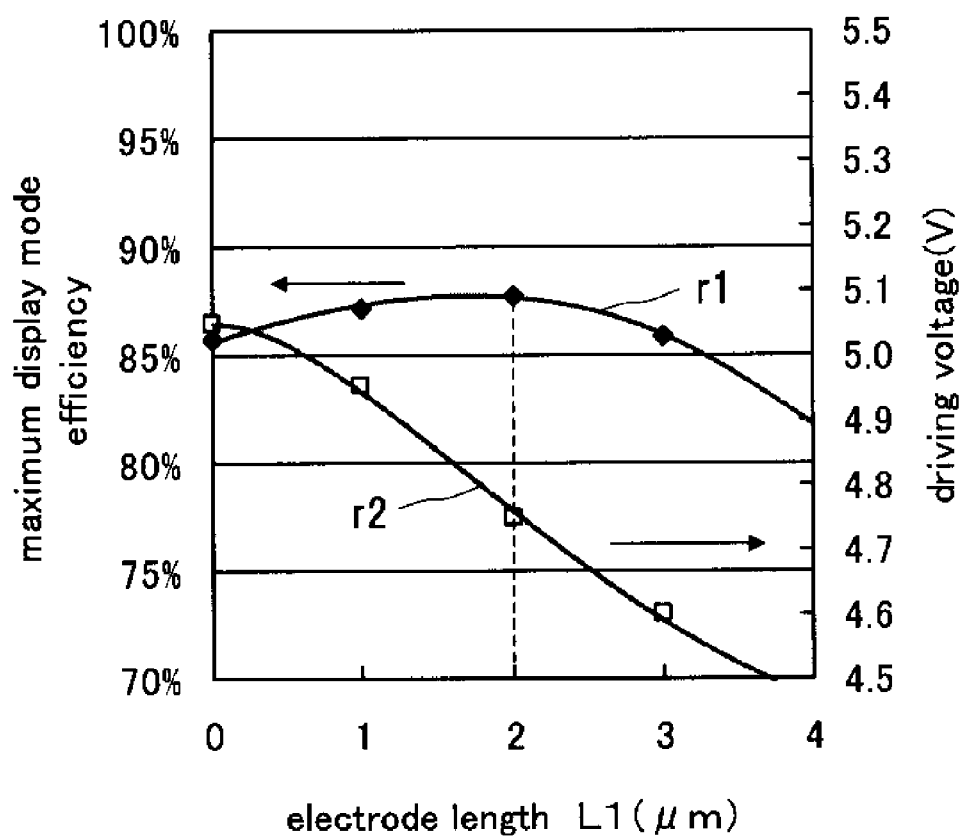
FIG. 4 is a diagram illustrating a relationship between a planar electrode width forming the wall electrode according to the first embodiment of the present invention and maximum display mode efficiency, and a relationship between the planar electrode width and a driving voltage giving the maximum display mode efficiency.
Figure 5A:
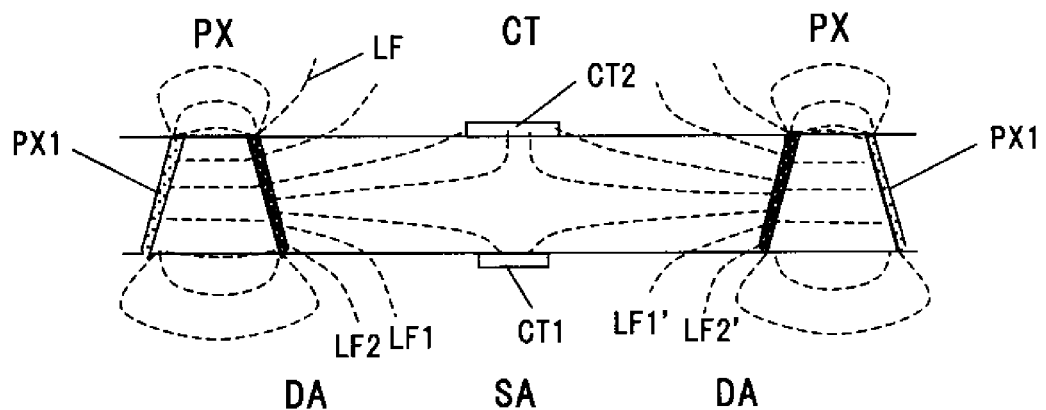
FIGS. 5A and 5B are diagrams illustrating distribution of the electric flux lines in the pixels according to the first embodiment of the present invention.
Figure 5B:
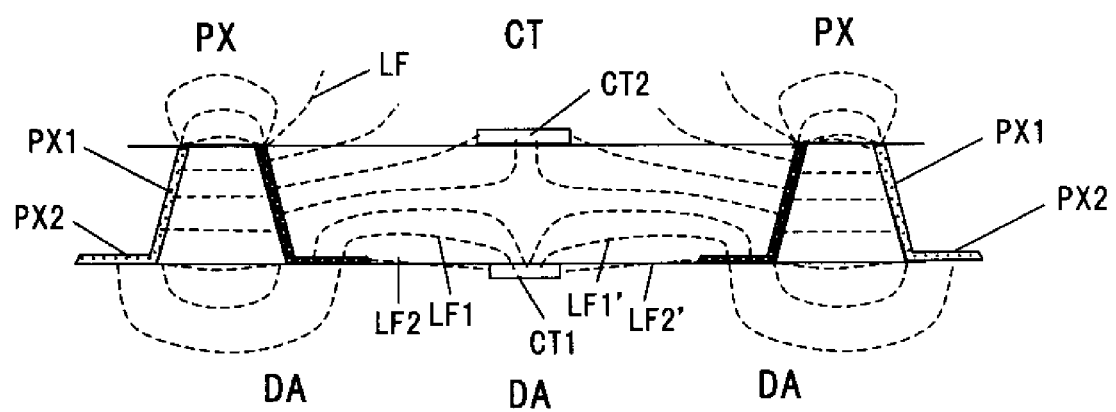

Next, FIG. 4 is a diagram illustrating a relationship between a planar electrode width forming the wall electrode according to the first embodiment of the present invention and maximum display mode efficiency, and a relationship between the planar electrode width and a driving voltage giving the maximum display mode efficiency. FIGS. 5A and 5B are diagrams illustrating distribution of the electric flux lines in the pixels according to the first embodiment of the present invention. Hereinafter, the wall electrode according to the first embodiment will be described in detail with reference to FIGS. 4 to 5B. Here, in FIGS. 5A and 5B, FIG. 5A shows distribution of the electric flux lines when the planar electrode PX2 is not formed, that is, the wall electrode PX is formed only by the wall-shaped electrode PX1, and FIG. 5B shows distribution of the electric flux lines when the planar electrode PX2 is formed, that is, the wall electrode PX is formed by the wall-shaped electrode PX1 and the planar electrode PX2. In addition, although a case will be described in which the wall electrodes PX at both ends of the pixel PXL are pixel electrodes and the pseudo-wall electrode CT is a common electrode in the liquid crystal display panel PNL according to the first embodiment, the wall electrodes at both ends of the pixel PXL may be common electrodes and the pseudo-wall electrode may be a pixel electrode. With this configuration, it is possible to further suppress black transmittance of adjacent pixels described later than in a case of using the wall electrodes at both ends of the pixel PXL as a pixel electrode.

The display mode efficiency shown in FIG. 4 is a value of one white display pixel when the white display pixel and black display pixel are alternately arranged, and, particularly, is transmittance excluding influence of absorption by the color filter CF or the polarizers POL1 and POL2, or influence of an aperture ratio. Therefore, when an oscillation direction of linearly polarized light emitted from the polarizer POL1 on the backlight unit side is incident to the polarizer POL2 on the opposite side (display surface side), display mode efficiency is 100% in a case of being rotated by 90 degrees.

As is clear from the graph r1 indicating a relationship between the planar electrode width and the maximum display mode efficiency shown in FIG. 4, a maximum value of the maximum display mode efficiency is present with respect to the electrode width L1 of the planar electrode PX2 forming the pixel electrode PX according to the first embodiment. That is to say, in the structure of the wall electrode PX according to the first embodiment, the maximum display mode efficiency is 86% when the planar electrode width L1 L1=0 μm, corresponding to the case where the planar electrode PX2 is not formed, whereas the maximum display mode efficiency is 88% of the maximum value in a case of L1=2 μm. In addition, when the planar electrode length L1 is L1=3 μm larger than L1=2 μm, the maximum display mode efficiency is reduced to 86%. Therefore, if the planar electrode length L1 is L1=0.5 to 2.8 μm from the graph r1, the maximum display mode efficiency can be improved, and, particularly, L1=2 μm is suitable.

Further, as is clear from the graph r2 indicating a relationship between the planar electrode width and the driving voltage giving the maximum display mode efficiency (hereinafter, referred to as Vmax), if the electrode length L1 of the planar electrode PX2 is increased, the driving voltage Vmax is gradually reduced. This is because, the increase in the planar electrode length L1 is equivalent to shortening the distance between the wall electrode PX and the pseudo-wall electrode CT, and an intensity of the electric field applied between the wall electrode PX and the pseudo-wall electrode CT can be made to be great. Thus, the planar electrode PX2 can contribute to lowering a driving voltage of the liquid crystal molecules.

From the above description, in the liquid crystal display panel PNL according to the first embodiment, the planar electrode PX2 forming the wall electrode PX is formed so as to have the electrode length L1=0.5 to 2.8 μm, and thereby it is possible to improve the maximum display mode efficiency and to lower a driving voltage. The planar electrode PX2 is formed suitably so as to have the electrode length L1=2 to 2.8 μm, and thereby it is possible to greatly lower a driving voltage and to improve the maximum display mode efficiency.

In addition, as shown in FIG. 5A, in a case where the planar electrodes are not provided at the wall electrodes PX at both ends of the pixel, that is, the wall electrode PX is formed only by the wall-shaped electrode PX1, since the wall electrode PX which is a pixel electrode is closer to the wall-shaped electrode PX1 of the adjacent pixel PXL than the pseudo-wall electrode CT, for example, the electric flux lines LF1 and LF2 generated from the lower (first substrate side) side portion of the left wall electrode PX in FIG. 5A and the electric flux lines LF1 and LF2 generated from the lower side portion of the right wall electrode PX in FIG. 5A respectively head toward the electrodes (wall electrodes PX) of the adjacent pixels. As a result, the density of the electric flux lines LF between the wall-shaped electrode PX1 which is a pixel electrode and the pseudo-wall electrode CT which is a common electrode becomes high around the wall electrode PX (indicated by DA in FIG. 5A) and becomes low at a region distant from the wall electrode PX, that is, around the pseudo-wall electrode CT (indicated by SA in FIG. 5A). Thereby, the electric field intensity between the electrodes in each pixel PXL is non-uniform, and thus the display mode efficiency is reduced.

On the other hand, as shown in FIG. 5B, in a case where the planar electrode PX2 is provided at the wall electrode PX, that is, the wall electrode PX is formed by the wall-shaped electrode PX1 and the planar electrode PX2, the density of the electric flux lines LF between the wall electrode PX and the pseudo-wall electrode CT can be made to be uniform. That is to say, the density of the electric flux lines LF between the wall electrode PX which is a pixel electrode and the pseudo-wall electrode CT which is a common electrode is high around the wall electrode PX (indicated by DA in FIG. 5B), and is also high in the region distant from the wall electrode PX, that is, around the pseudo-wall electrode CT.

Two reasons may be considered. One is that if the planar electrode PX2 is provided at the wall-shaped electrode PX1 as described above, the distance with the pseudo-wall electrode CT becomes short, and thus non-uniformity of the density of the electric flux lines LF is suppressed (reason 1). The other is that since the electric flux lines LF are vertically generated from the electrodes (the wall-shaped electrode PX1 and the planar electrode PX2) and two or more do not intersect each other, many electric flux lines LF generated from the upper surface (liquid crystal layer LC side) of the planar electrode PX2 can be rapidly bent toward the pseudo-wall electrode CT by the electric flux lines LF generated from the wall-shaped electrode PX1. The electric flux lines (for example, the electric flux lines LF1, LF2, LF1 and LF2) pass between the planar electrode PX2 and the pseudo-wall electrode CT and reach the pseudo-wall electrode CT without heading toward the electrodes of the adjacent pixels, and thus contribute to suppressing a variation in the density of the electric flux lines LF between the wall electrode PX and the pseudo-wall electrode CT. Therefore, the wall electrode PX is formed by the wall-shaped electrode PX1 and the planar electrode PX2, and thereby it is possible to suppress non-uniformity of the electric field intensity when there is no planar electrode PX2 (reason 2). From the reasons 1 and 2, by providing the planar electrode PX2 at the wall electrode PX, it is thought that it is possible to suppress the display mode efficiency from being reduced due to electric field intensity non-uniformity in the pixel PXL. That is to say, by forming the planar electrode PX2, the electric flux lines LF in all the regions in each pixel can be dense so as to efficiently drive the liquid crystal molecules, and thereby it is possible to improve the display mode efficiency.

At this time, as shown in FIG. 4, the maximum display mode efficiency has a peak value when the length (electrode length L1) of the planar electrode PX2 is 2 μm, and is lowered when equal to or more than it. This is because if the planar electrode PX2 is lengthened, since a ratio of the component of the electric flux lines LF in the thickness direction (Z direction) of the liquid crystal layer is increased, a tilt angle of the liquid crystal molecules forming the liquid crystal layer LC, and thus a necessary phase difference cannot be obtained. Therefore, the length of the planar electrode PX2 of the wall electrode PX is required to be appropriately selected such that the electric field in the pixel PXL does not become a vertical electric field excessively.

Figure 6:
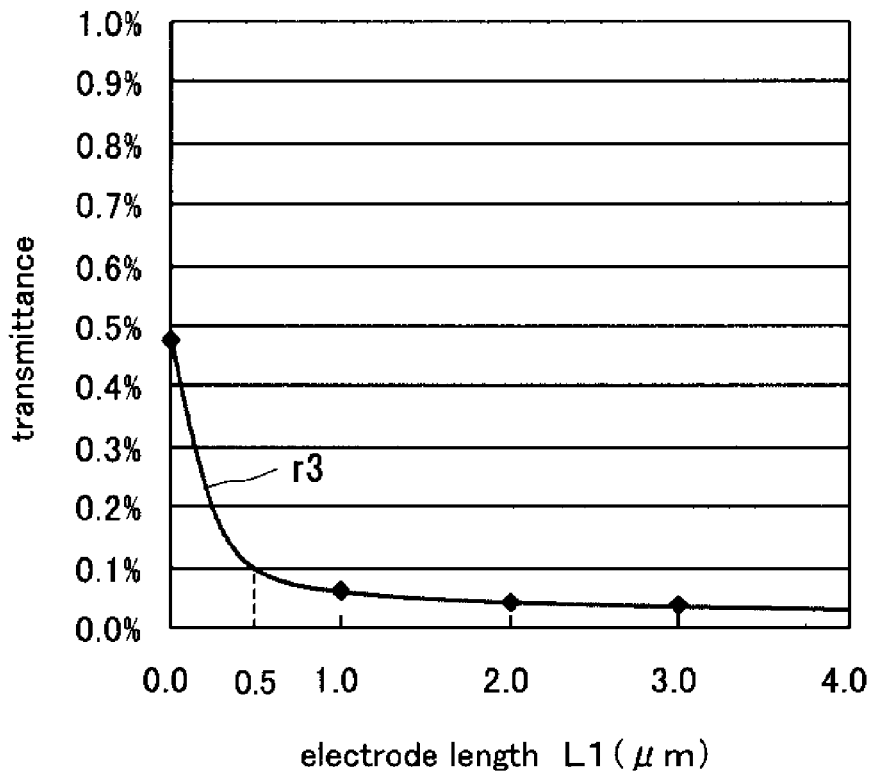
FIG. 6 is a diagram illustrating a relationship between the planar electrode length in the pixel configuration according to the first embodiment of the present invention and black transmittance at wire potential 5V during black display.
Figure 7:
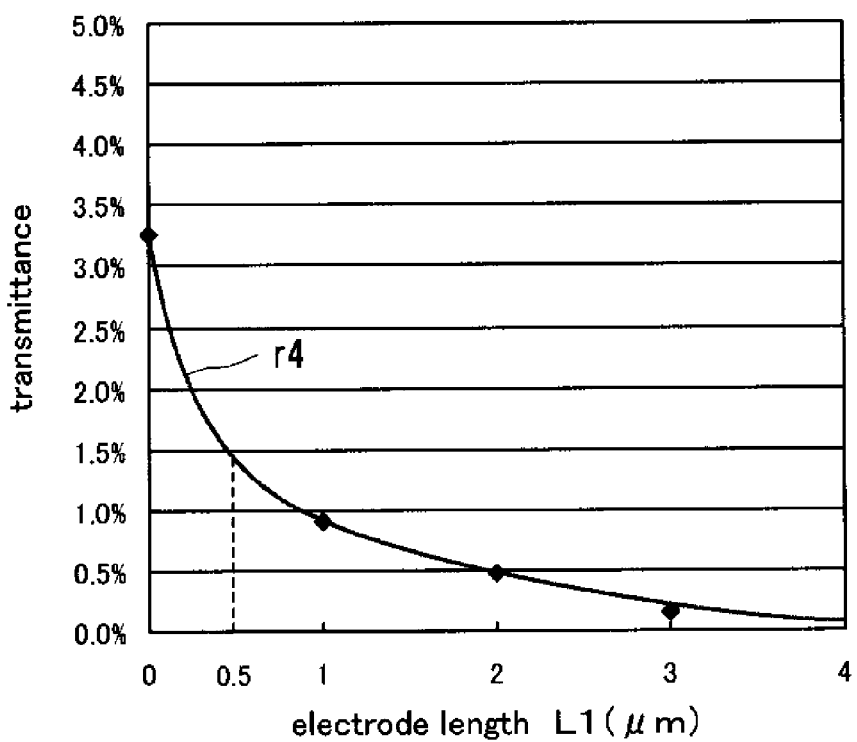
FIG. 7 is a diagram illustrating a relationship between the planar electrode length in the pixel configuration according to the first embodiment of the present invention and black transmittance of an adjacent pixel.

FIG. 6 is a diagram illustrating a relationship between the planar electrode length in the pixel configuration according to the first embodiment of the present invention and black transmittance at wire potential 5V during black display, and FIG. 7 is a diagram illustrating a relationship between the planar electrode length in the pixel configuration according to the first embodiment of the present invention and black transmittance of an adjacent pixel. Hereinafter, there will be made a description of an effect that the wall electrode according to the first embodiment suppresses an increase in black transmittance due to a wire potential during black display with reference to FIGS. 6 and 7. In addition, the measurement results shown in FIGS. 6 and 7 are results regarding the drain lines DL.

The wires include the drain lines DL and the gate lines GL, potentials at the wires are potentials enough to vary the liquid crystal alignment, and thus there is concern that the electric flux lines generated from the wires may increase transmittance during black display (hereinafter, referred to as black transmittance) even in the first embodiment.

As is clear from the graph r3 of FIG. 6, in a case where there is no planar electrode at the wall electrode, that is, L1=0 (zero), the black transmittance is about 0.5%, whereas the black transmittance is 0.1% or less when the length L1 of the planar electrode PX2 is L1=0.5 μm or more, and the black transmittance is 0.06% or less when the length L1 of the planar electrode PX2 is L1=1 μm or more. From the graph r3, the length L1 of the planar electrode PX2 is preferably L1=0.5 μm or more, and more preferably L1=1 μm or more.

From this result, in the case where there is no planar electrode PX2 at the wall electrode PX, since the electric flux lines generated from the wires reach the wall-shaped electrode PX1 close to the wires through the liquid crystal layer, the liquid crystal is easily moved, and thus black display mode efficiency is increased. On the other hand, if the planar electrode PX2 is provided at the wall electrode PX, the electric flux lines generated from the wires are shielded at the lower surface of the planar electrode PX2, and thus the number of the electric flux lines reaching the liquid crystal can be reduced. As a result, by lengthening the planar electrode PX2, many electric flux lines can be shielded, and thus it is possible to suppress the black transmittance from being increased due to the wire potential.

As is clear from the graph r4 of FIG. 7, the planar electrode PX2 also achieves an effect of suppressing black transmittance of a black display pixel adjacent to a white display pixel. That is to say, as shown in FIG. 7, in the case where there is no planar electrode PX2 at the wall electrode PX, that is, the length L1 of the planar electrode PX2 is L1=0 (zero), the black transmittance of the adjacent pixel is 3.4%, whereas in a case where the length L1 of the planar electrode PX2 is L1=0.5 μm, the black transmittance of the adjacent pixel can be reduced to 1.5% or less which is a half or less of the case where L1=0 μm, that is, the planar electrode PX2 is not provided. In addition, in a case where the length L1 of the planar electrode PX2 is L1=1 μm, the black transmittance of the adjacent can be reduced to 0.9% which is about a quarter of the case of L1=0 μm. From the graph r4, the length L1 of the planar electrode PX2 is preferably L1=0.5 μm or more, and more preferably L1=1 μm or more.

From this result, in the case where there is no planar electrode PX2 at the wall electrode PX, the electric flux lines generated from the wall electrode PX of the white display pixel turn around both the side portions of the second substrate SUB2 side and the first substrate SUB1 side of the corresponding wall electrode PX and reach the wall electrode PX of the adjacent pixel PXL, thus the liquid crystal (liquid crystal molecules) of the adjacent pixel PXL is easily moved, and thereby the black transmittance is increased. On the other hand, if the planar electrode PX2 is provided at the wall electrode PX, the electric flux lines reaching the adjacent pixel PXL through the first substrate SUB1 where the planar electrode PX2 is formed can be shielded, and thus it is possible to reduce the black transmittance of the adjacent pixel PXL. From the above description, provision of the planar electrode PX2 at the wall electrode PX achieves an effect of suppressing an increase in the black transmittance of the adjacent pixel PXL.

As above, by providing the planar electrode PX2 at the wall electrode PX, the following effects of lowering a driving voltage of the liquid crystal, improving the display mode efficiency, suppressing an increase in the black transmittance due to the wire potential, and suppressing an increase in the black transmittance of the adjacent pixel are achieved.

Detailed Effects of Pseudo-Wall Electrode

The pseudo-wall electrode CT in the liquid crystal display device according to the first embodiment, as described above, is formed by the linear electrodes CT1 and CT2 which are disposed between the wall electrodes PX provided at both ends of the pixel PXL in the transverse direction of the pixel PXL (the X direction in FIGS. 2 and 3) and extend in the longitudinal direction of the pixel PXL (the Y direction in FIGS. 2 and 3). That is to say, the pseudo-wall electrode CT according to the first embodiment functions as a pseudo-wall electrode in the overlapping region by providing the linear electrodes CT1 and CT2 of the same potential at the first substrate SUB1 and the second substrate SUB2 which are disposed so as to be opposite to each other via the liquid crystal layer LC, and implements a configuration where a horizontal electric field is easily applied between the wall electrodes PX at both ends of the pixel PXL and the pseudo-wall electrode CT. With this configuration, it is possible to suppress non-uniformity of the electric field intensity between the wall electrode PX and the pseudo-wall electrode CT, and thus there is an achievement of an effect that the display mode efficiency can be improved.

For example, in a case where wall electrodes of the pixel electrode and the common electrode are provided at both ends of the pixel PXL, that is, one wall electrode PX of the wall electrodes PX according to the first embodiment is a pixel electrode and the other wall electrode PX is a common electrode, the electric field intensity between the electrodes is uniform if a gap between a pair of wall electrodes PX is small, but the electric field intensity between the electrodes becomes non-uniform if the gap between the electrodes is large.

In contrast, in the pixel configuration according to the first embodiment, both of the wall electrodes PX formed at both ends of the pixel PXL are pixel electrodes, the pseudo-wall electrode CT is formed in the region between the wall electrodes PX, and the pseudo-wall electrode CT is a common electrode. Therefore, this is equivalent to shortening the distance between the pixel electrode and the common electrode, and thus it is possible to suppress non-uniformity of the intensity of the electric field generated between the wall electrode PX which is a pixel electrode and the pseudo-wall electrode CT which is a common electrode.

In addition, since the electric field is applied to the liquid crystal (liquid crystal molecules) on the pseudo-wall electrode CT, that is, the liquid crystal molecules in the region where the linear electrode CT1 and the linear electrode CT2 overlap each other, the liquid crystal on the pseudo-wall electrode CT, that is, the liquid crystal molecules in the region where the linear electrode CT1 and the linear electrode CT2 overlap each other are also moved (driven) and thus can contribute to image display. Therefore, it is possible to realize high display mode efficiency in all the pixels.

In addition, since an electric field around the pseudo-wall electrode CT is strong when the width of the pseudo-wall electrode CT is small, the liquid crystal on the pseudo-wall electrode CT can be easily moved. Therefore, by making the width of the pseudo-wall electrode CT small, it is possible to improve the display mode efficiency in all the pixels. This effect can be achieved even in a case where there is a difference between the electrode width W2 of the linear electrode CT2 on the second substrate SUB2 side of the pseudo-wall electrode CT and the electrode width W1 of the linear electrode CT1 on the first substrate SUB1 side. This is because the electric flux lines pass through the liquid crystal on the pseudo-wall electrode CT even if the electrode widths W1 and W2 are different from each other. However, if the widths W1 and W2 of the pseudo-wall electrode CT are too large, since the electric flux lines do not pass through the liquid crystal on the pseudo-wall electrode CT, the liquid crystal is not moved, and thereby the display mode efficiency is reduced. From this, the linear electrodes CT1 and CT2 on the first substrate SUB1 side and the second substrate SUB2 side are required to selectively have the widths W1 and W2 capable of moving the liquid crystal on the pseudo-wall electrode CT. Particularly, it is suitable to form the electrode width W2 of the linear electrode CT2 so as to be larger than the electrode width W1 of the linear electrode CT1. The electric field around the wall electrode PX easily occur in the upper right direction in the figure by the electric flux lines in the transverse direction generated from the wall-shaped electrode PX1 and the electric flux lines in the longitudinal direction generated from the planar electrode PX2, and thus it is necessary to also set the electric field around the pseudo-wall electrode CT to be generated in the upper right direction in order to make the electric field between the wall electrode PX and the pseudo-wall electrode CT uniform. If the electric field around the pseudo-wall electrode CT is to be generated in the upper right direction, it is effective to set the electrode width W2 of the pseudo-wall electrode CT2 to be larger than W1. Since the electric field around the pseudo-wall electrode CT is easily generated in the upper right direction by setting the electrode width W2 of the pseudo-wall electrode CT2 to be larger than W1, horizontal electric field components around the wall electrode PX and the pseudo-wall electrode CT become uniform. Therefore, it is possible to obtain high display mode efficiency. On the other hand, if the electrode width W1 of the pseudo-wall electrode CT1 is set to be larger than W2, since the electric field around the pseudo-wall electrode CT is easily generated in the lower right direction, the horizontal electric field components around the wall electrode PX and the pseudo-wall electrode CT become non-uniform. Therefore, the display mode efficiency is lowered. From the above description, it is suitable to set the electrode width W2 of the linear electrode CT2 to be larger than the electrode width W1 of the linear electrode CT1.

The wall electrode PX according to the above-described first embodiment is formed of a transparent conductive film, but is not limited to the transparent conductive film. For example, in a case where the wall electrodes PX at both ends of the pixel PXL are hidden by the black matrix BM, a metal material may be used as an electrode material of the wall electrode PX. An ITO film used for the transparent electrode is amorphous at most portions of the film, but a part thereof is crystallized. As such, if a part of the ITO film is crystallized, an etching speed of the crystallized portion is smaller by about two orders of magnitude than that of the amorphous portion, and thus remains as a so-called etching remainder in the subsequent etching.

In contrast, in a case where a material of the wall electrode PX is a metal electrode, film quality of the metal is uniform, and thus an etching speed in the film can be made to be uniform. For this reason, an etching remainder is not left, and thus a problem such as short-circuited wires is not likely to occur. Therefore, a yield of liquid crystal display devices is improved, and this leads to low costs. However, since the transmittance of the metal electrode is almost 0%, the transmittance is reduced if the metal electrode is disposed at an opening portion of the pixel PXL. Therefore, the metal electrode is applied to a material of the wall electrode PX, the length L2 of the wall electrode PX is preferably smaller than the length L3 of the black matrix. In other words, the length L2 of the wall electrode is preferably in a range of 0<L2≤L3.

As described above, in the liquid crystal display device according to the first embodiment, of the first substrate SUB1 and the second substrate SUB2 disposed so as to be opposite to each other via the liquid crystal layer LC, the pixel electrode PX and the linear electrode CT1 are formed on the liquid crystal layer LC side (opposite surface side) of the first substrate SUB1, and the linear electrode CT2 is formed on the liquid crystal layer LC side of the second substrate SUB2. The linear electrodes CT1 and CT2 are disposed so as to overlap each other via the liquid crystal layer LC, thereby forming a pseudo-wall-shaped common electrode. In addition, a step difference having a convex shape is formed on the opposite surface side of the first substrate SUB1 along at least a pair of edges opposite to each other in the pixel region, the wall-shaped electrode is formed at the side wall surface of the step difference, and the planar electrode is formed at the planar portion extending from the side wall surface, thereby forming a pixel electrode. The liquid crystal molecules are driven by an electric field applied between the pixel electrode and the common electrode, and thus it is possible to improve display mode efficiency (maximum display mode efficiency).

In addition, in the configuration according to the first embodiment, the wall-shaped electrode PX1 forming the wall electrode PX has a predetermined gap with the opposite surface of the second substrate SUB2, but is not limited thereto. For example, such as a case where the insulating layer PAS3 is a columnar space and the wall-shaped electrode PX1 is formed at the side wall surface of the insulating layer PAS3, the wall-shaped electrode PX1 may reach the second substrate SUB2.

[Second Embodiment]

Figure 8:
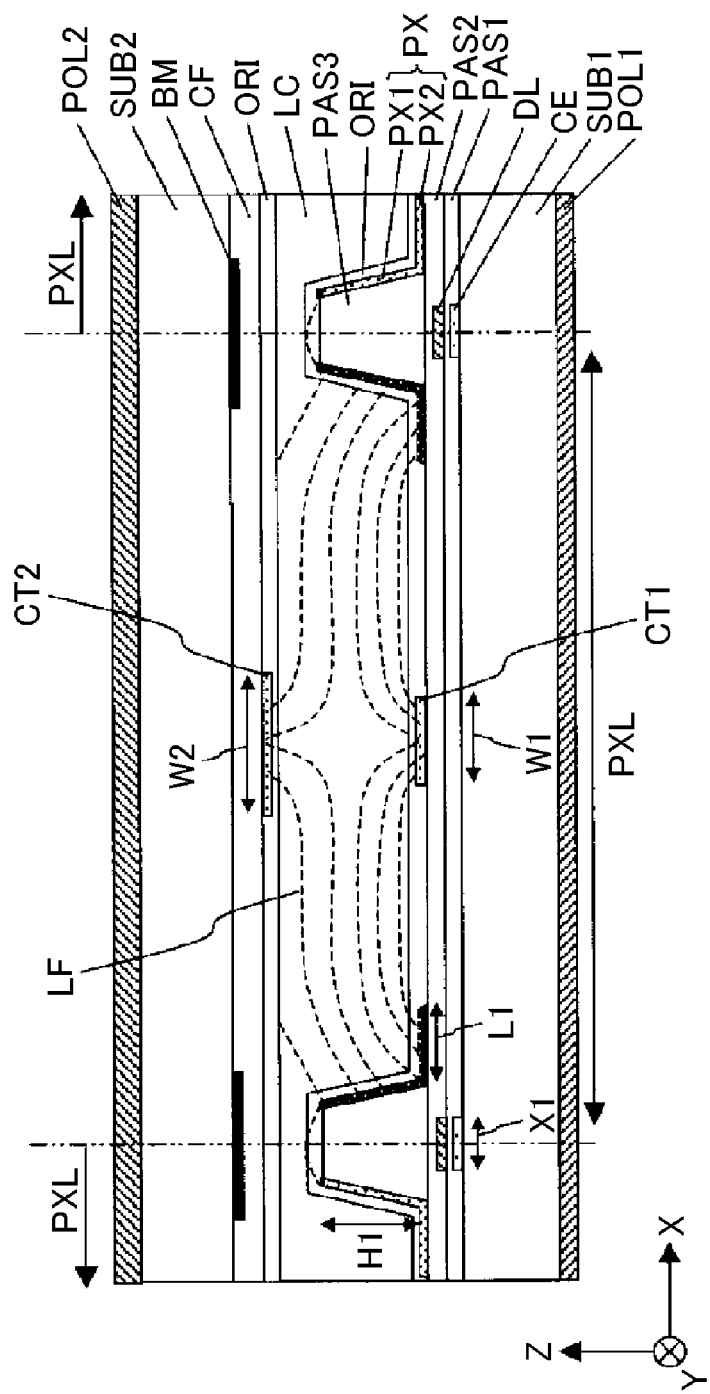
FIG. 8 is a cross-sectional view illustrating a pixel configuration in a liquid crystal display device according to a second embodiment of the present invention.

FIG. 8 is a cross-sectional view illustrating a pixel configuration in a liquid crystal display device according to the second embodiment of the present invention, and the liquid crystal display device according to the second embodiment will be described with reference to FIG. 8. Here, the liquid crystal display device according to the second embodiment is different from the liquid crystal display device according to the first embodiment only in that cover electrodes CE are formed at the lower layer of the drain lines DL which are wires, that is, on the first substrate SUB1 side, and other configurations are the same. Therefore, in the following description, the cover electrodes CE will be described in detail. In addition, in the following description, a case where the cover electrodes CE are formed at the lower layer of the drain lines DL which are wires will be described; however, the cover electrodes CE may be formed at the lower layer of the gate lines. In addition, the cover electrodes CE may be formed along with the drain lines DL at the lower layer of the gate lines. Further, in the following description, a case where 0 (zero) V is applied to the cover electrodes CE will be described; however, other voltages may be applied thereto.

As shown in FIG. 8, in the liquid crystal display device according to the second embodiment, the second substrate SUB2 disposed so as to be opposite to the first substrate SUB1 via the liquid crystal layer LC has the same configuration as the configuration according to the first embodiment. On the other hand, in the first substrate SUB1, the cover electrodes CE are disposed via the insulating layer PAS1 at the lower layer of the drain lines DL which are wires formed in the pixel region. At this time, the cover electrodes CE are formed along the drain line DL, thus extend in the Y direction in the display region, and are arranged in parallel to each other in the Y direction in the same manner as drain lines DL. That is to say, the wire (the drain line DL or the gate line GL) are formed in the region between the insulating layer PAS3 at which the wall-shaped electrode PX1 forming the wall electrode PX is formed and the cover electrode CE.

In other words, in the liquid crystal display device according to the second embodiment, a conductive thin film which is the cover electrode CE is formed at the upper surface side (opposite surface side) of the first substrate SUB1, and the insulating layer PAS1 is formed on the upper surface of the first substrate SUB1 including the upper layer of the cover electrode CE. The drain line DL is formed on the insulating layer PAS1, and the insulating layer PAS2 is formed thereon so as to cover the opposite surface side of the first substrate SUB1. The insulating layer PAS3 having a convex shape is formed at the upper layer of the drain line DL on the insulating layer PAS2 along the region of the pixel PXL, and the wall-shaped electrode PX1 of the adjacent pixel is formed at the side wall surface of the insulating layer PAS3. At this time, the planar electrode PX2 is formed at the upper surface of the insulating layer PAS2 along the edge of the first substrate SUB1 side of the wall-shaped electrode PX1, and the wall-shaped electrode PX1 and the planar electrode PX2 form the wall electrode PX of the present invention. Further, the linear electrode CT1 is formed on the insulating layer PAS2, and the linear electrode CT2 formed in the second substrate SUB2 and the linear electrode CT1 form the pseudo-wall electrode CT which is a common electrode. In addition, the alignment layer ORI is formed on the surface of the first substrate SUB1 so as to cover the wall electrode PX and the linear electrode CT1, and controls initial alignment of the liquid crystal layer LC interposed between the first substrate SUB1 and the second substrate SUB2.

Figure 9:
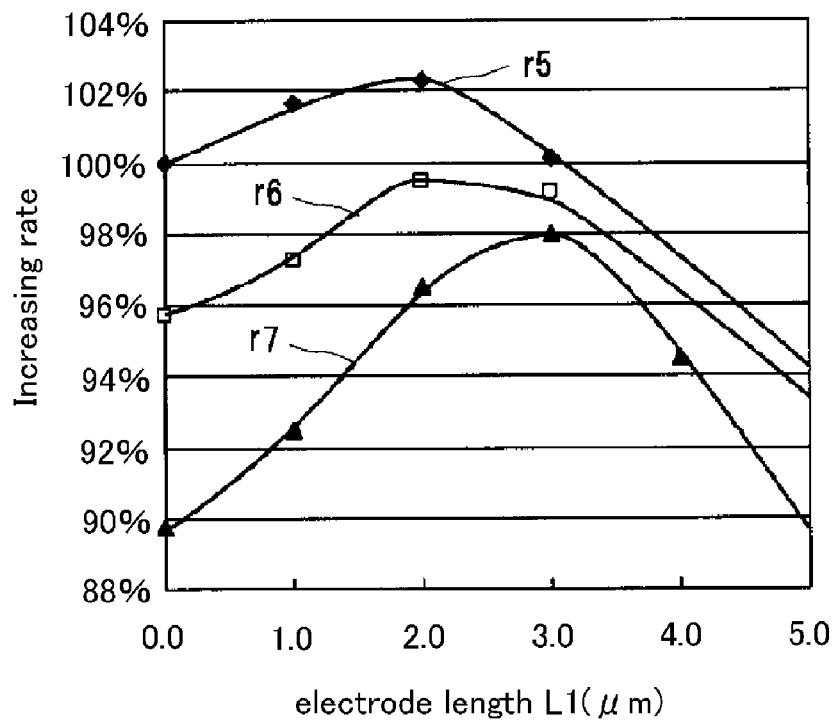
FIG. 9 is a display mode efficiency increasing rate depending on the planar electrode length for each width of the cover electrode in the liquid crystal display device according to the second embodiment of the present invention.
Figure 10:
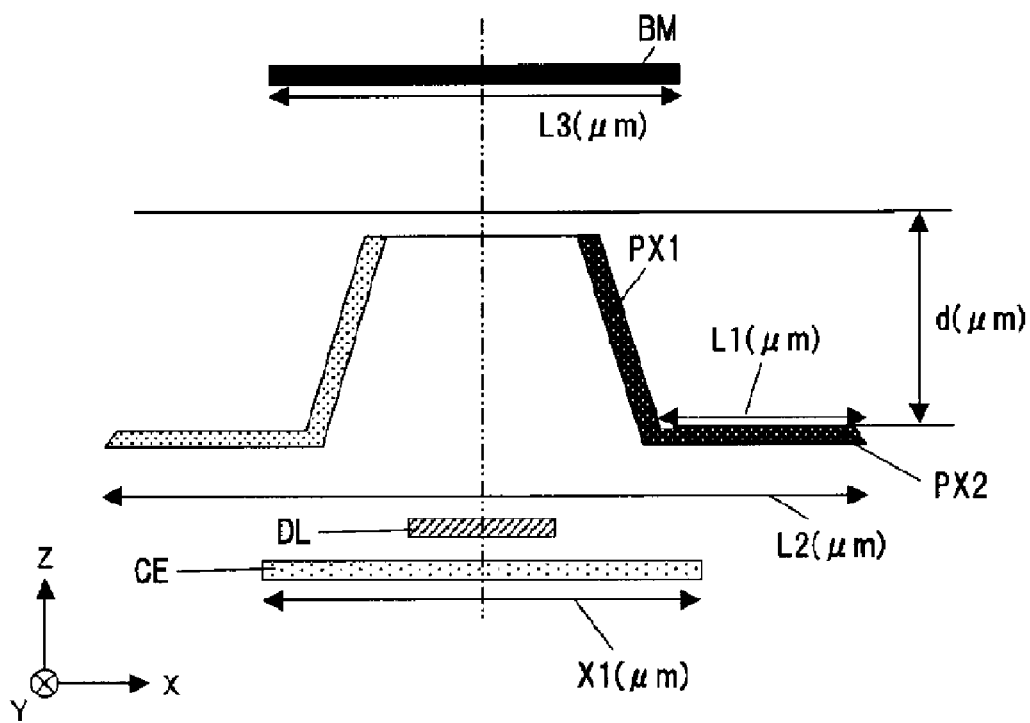
FIG. 10 is a diagram illustrating parameters between a wall electrode and a pseudo-wall electrode in the liquid crystal display device according to the second embodiment of the present invention.

Next, FIG. 9 is a display mode efficiency increasing rate depending on the planar electrode length for each width of the cover electrode in the liquid crystal display device according to the second embodiment of the present invention, and FIG. 10 is a diagram illustrating parameters between a wall electrode and a pseudo-wall electrode in the liquid crystal display device according to the second embodiment of the present invention. Hereinafter, the liquid crystal display device according to the second embodiment will be described with reference to FIGS. 9 and 10. Here, a reference value (100%) shown in FIG. 9 corresponds to a case where the cover electrode width X1 and the length L1 of the planar electrode are respectively 0 µm, that is, the cover electrode CE and the planar electrode PX2 are not provided. The graph r5 indicates a display mode efficiency increasing rate with respect to the length L1 of the planar electrode PX2 when the cover electrode width X1 is X1=0 µm, the graph r6 indicates a display mode efficiency increasing rate with respect to the length L1 of the planar electrode PX2 when the cover electrode width X1 is X1=2 µm, and the graph r7 indicates a display mode efficiency increasing rate with respect to the length L1 of the planar electrode PX2 when the cover electrode width X1 is X1=4 µm.

As shown in FIG. 10, in the following description, the electrode width (the width in the X direction) of the cover electrode CE formed at the lower layer of the drain line DL is X1, and the width (width in the X direction) of the black matrix BM formed in an overlapping manner in the formation region of the wall electrode PX is L3. In addition, the distance from the liquid crystal surface side of the planar electrode PX2 to the second substrate SUB2, that is, the thickness of the liquid crystal layer LC is d. Further, of the wall electrodes PX formed by the wall-shaped electrodes PX1 formed at the side wall surfaces of the insulating layer PAS3 which is a convex-shaped body formed between the adjacent pixels and the planar electrodes PX2, a distance from the end portion of the wall electrode PX of one pixel side, formed by the wall-shaped electrodes PX1 and the planar electrodes PX2 respectively formed at the side wall surfaces of the single convex-shaped body (insulating layer PAS3) in the adjacent pixels, to the end portion of the wall electrode PX of the other pixel, is the electrode width L2 of the wall electrode PX. In other words, in the present specification, the electrode width L2 of the wall electrode PX is a gap between the inner edge portion of the planar electrode PX2 of one adjacent pixel and the inner edge portion of the planar electrode PX2 of the other adjacent pixel, formed at the single insulating layer PAS3.

As is clear from FIG. 9, when the electrode length L1 of the planar electrode PX2 is 0 µm, and the electrode width X1 of the cover electrode CE is 2 µm (the graph r6) and 4 µm (the graph r7), the display mode efficiency increasing rate is greatly reduced as 95.7% and 89.8% with respect to the reference value. This is because, if the width X1 of the cover electrode CE is increased, the distance (gap) between the wall electrode PX and the cover electrode CE becomes smaller, and thus the electric flux lines LF generated from the wall electrode PX easily reach the cover electrode CE. As a result, the electric flux lines LF heading toward the pseudo-wall electrode CT from the wall electrode PX are decreased, and thereby the electric field intensity between the wall electrode PX and the pseudo-wall electrode CT becomes non-uniform.

On the other hand, when the electrode width X1 of the cover electrode CE is 2 µm and 4 µm, as is clear from the graphs r6 and r7, the display mode efficiency becomes the maximum at the planar electrode length L1 of 2 µm and 3 µm, respectively, and thus can be improved to 99.5% and 97.9% with respect to the reference value. A reason thereof may be considered as follows. A large number of electric flux lines LF generated from the upper surface of the planar electrode PX2 are rapidly bent by the electric flux lines LF generated from the wall-shaped electrode PX1 and then reach the pseudo-wall electrode CT. These electric flux lines LF do not head toward the electrodes of the adjacent pixels PXL but pass between the planar electrode PX2 and the pseudo-wall electrode CT, and thus density distribution of the electric flux lines LF between the wall electrode PX and the pseudo-wall electrode CT can be made to be uniform. Therefore, it is thought that non-uniformity of the electric field intensity can be suppressed. In addition, as shown in the graph r5, in a case where the electrode width X1 of the cover electrode CE is X1=0 (zero), that is, the cover electrode CE is not provided, the display mode efficiency becomes the maximum when the planar electrode length L1 is 2 µm.

In other words, by providing the planar electrode PX2 at the wall electrode PX, it is possible to suppress a decrease in the display mode efficiency due to the cover electrode CE. However, if the planar electrode PX2 is much longer than the liquid crystal layer thickness d, the display mode efficiency is decreased. There are two reasons. One is that, as described in the first embodiment, if the planar electrode PX2 is lengthened, a vertical electric field is applied to the liquid crystal on the planar electrode PX2, and thereby a problem occurs in which the necessary phase difference cannot be obtained due to an increase in the tilt angle of the liquid crystal molecules of the liquid crystal layer LC. The other is that, if the planar electrode PX2 is larger than the wall-shaped electrode PX1, the electric flux lines LF generated from the planar electrode PX2 become more than the electric flux lines LF generated from the wall-shaped electrode PX1, and thereby horizontal electric field components applied between the wall electrode PX and the pseudo-wall electrode CT is reduced. The height of the wall-shaped electrode PX1 is equal to or less than the thickness d of the liquid crystal layer LC in consideration of a joining process of the second substrate SUB2 and the first substrate SUB1 forming the liquid crystal display panel PNL, and thus the length L1 of the planar electrode PX2 is in a range of L1≤d which is equal to or less than the liquid crystal layer thickness d in a case of the height of the wall electrode PX≤the liquid crystal layer thickness d. In addition, the length L1 of the planar electrode PX2 is preferably equal to or more than 0.5 μm as is clear from the above-described first embodiment. From the above description, in a case of the height of the wall electrode PX≤the liquid crystal layer thickness d, the length L1 of the planar electrode PX2 is suitable in a range of 0.5≤L1≤d (μm).

On the other hand, in a case where the height H1 of the wall electrode is larger than the liquid crystal layer thickness d, if the planar electrode PX2 is shorter than the wall-shaped electrode PX1, the electric flux lines LF generated from the wall-shaped electrode PX1 become more than the electric flux lines LF generated from the planar electrode PX2, and thus horizontal electric field components applied between the wall electrode PX and the pseudo-wall electrode CT become large. On the other hand, if the length of the planar electrode PX2 is larger than the height H1 of the wall electrode, the vertical electric field is applied to the liquid crystal on the planar electrode PX2 for the above-described reason, a problem occurs in which the necessary phase difference cannot be obtained due to an increase in the tilt angle of the liquid crystal molecules of the liquid crystal layer LC, and thus the display mode efficiency is reduced. Therefore, in a case of the height H1 of the wall electrode>the liquid crystal layer thickness d, the length L1 of the planar electrode PX2 is in a range of L1≤H1 which is equal to or less than the height H1 of the wall electrode. In addition, the length L1 of the planar electrode PX2 is preferably equal to or more than 0.5 μm as is clear from the above-described first embodiment. From the above description, in a case of the height H1 of the wall electrode>the liquid crystal layer thickness d, the length L1 of the planar electrode PX2 is suitable in a range of 0.5≤L1≤H1.

Figure 11:
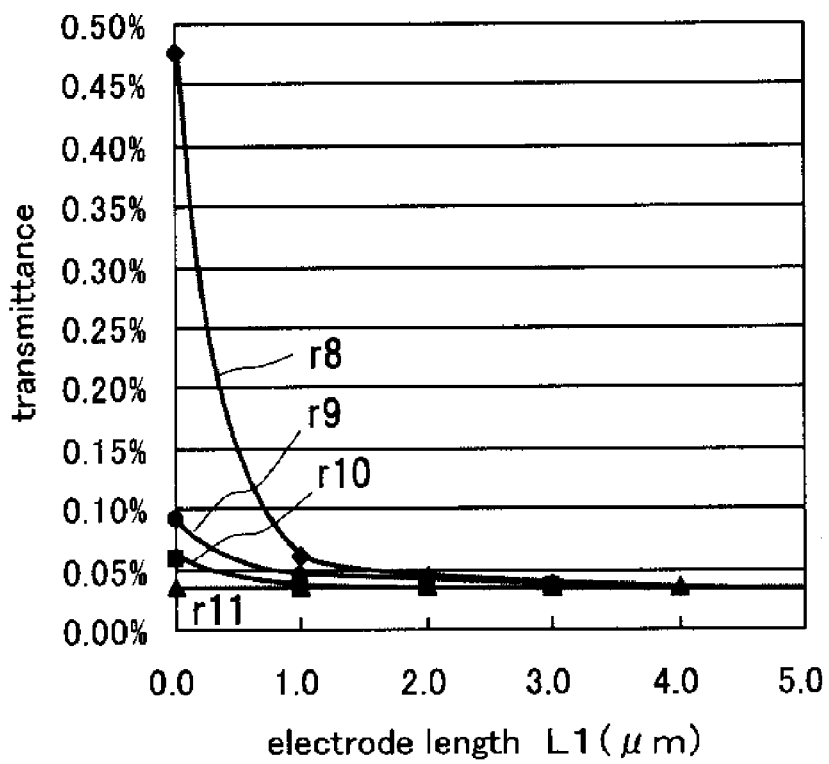
FIG. 11 is a diagram illustrating a relationship between the planar electrode length of the wall electrode for each width of the cover electrode and black transmittance during black display in the liquid crystal display device according to the second embodiment of the present invention.

Further, in the liquid crystal display device according to the second embodiment as well, the planar electrode PX2 forming the wall electrode PX achieves an effect of suppressing an increase in the black transmittance due to a wire (drain lines DL and the like) potential during black display. FIG. 11 is a diagram illustrating a relationship between the planar electrode length of the wall electrode for each width of the cover electrode and black transmittance during black display in the liquid crystal display device according to the second embodiment of the present invention. Here, the black transmittance shown in FIG. 11 corresponds to a measured value of the black transmittance when a wire potential of the drain line DL is 5 (V) during black display. In addition, in the black transmittance shown in FIG. 11, the graph r8, the graph r9, the graph r10, and the graph r11 respectively indicate black transmittance with respect to the length L1 of the planar electrode PX2 in a case where the cover electrode width X1 is 0 μm, that is, the cover electrode is not provided, in a case where the cover electrode width X1 is 0.5 μm, in a case where the cover electrode width X1 is 2 μm, and in a case where the cover electrode width X1 is 4 μm.

As is clear from FIG. 11, even in a case where the length L1 of the planar electrode PX2 is 0 μm, that is, the planar electrode PX2 is not provided, as can be seen from the graph r9 to the graph r11, the black transmittance is 0.09% when the cover electrode width X1 is 0.5 μm, the black transmittance is 0.06% at X1=2 μm, and the black transmittance is about 0.03% at X1=4 μm. On the other hand, in a case where the cover electrode width X1 is 0 μm, that is, the cover electrode CE is not provided, the black transmittance is 0.48% at L1=0, it is possible to suppress or reduce the black transmittance by providing the cover electrode CE.

In addition, as is clear from the graph r9 to the graph r11, when the planar electrode PX2 is formed, and the electrode length L1 thereof is L1=0.5 μm or more, in a case where the electrode length L1 is increased, the black transmittance is reduced according to the increase in the planar electrode width L1, and the cover electrode width X1 gradually approaches the black transmittance at the cover electrode width X1 of 4 μm.

Therefore, for the same reason as in the first embodiment, if the length L1 of the planar electrode PX2 is increased, it is possible to suppress an increase in the black transmittance due to influence of the wire potential (potential of the drain line DL). On the other hand, if the electrode width X1 of the cover electrode CE formed under the wire is increased, it is possible to further suppress an increase in the black transmittance due to influence of the wire potential. This is because, in a case where the cover electrode CE is not formed, the electric flux lines LF generated from the lower surface of the wire (the first substrate SUB1 side) reach the wall electrode PX, thus the liquid crystal is operated, and thereby the black transmittance is increased, whereas, if the cover electrode CE is formed, the electric flux lines LF generated from the lower surface of the wire is shielded by the cover electrode CE, and thus it is possible to suppress the electric flux lines LF from reaching the liquid crystal. Therefore, the cover electrode CE achieves an effect of suppressing the black transmittance due to the wire potential.

Figure 12:
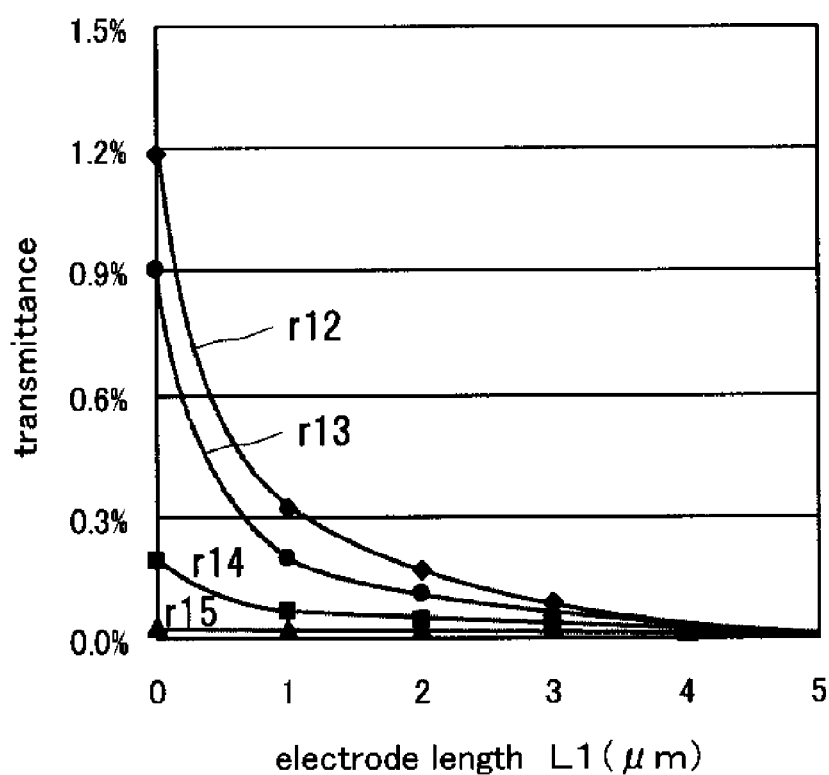
FIG. 12 is a diagram illustrating a relationship between the planar electrode length of the wall electrode for each width of the cover electrode and black transmittance of an adjacent pixel in the liquid crystal display device according to the second embodiment of the present invention.
Figure 13:
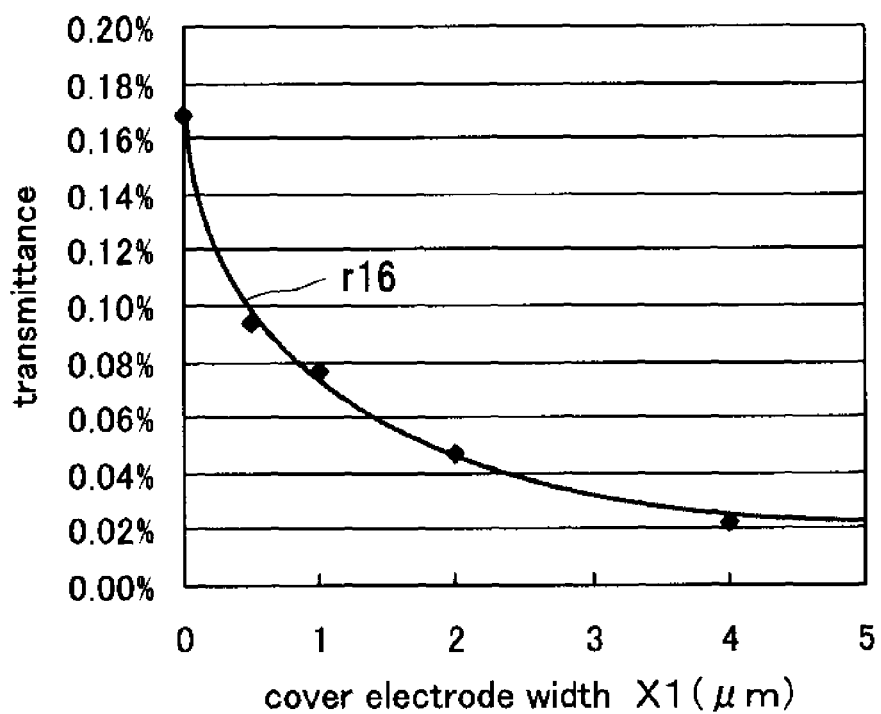
FIG. 13 is a diagram illustrating a relationship between the cover electrode width and the black transmittance of the adjacent pixel in the liquid crystal display device according to the second embodiment of the present invention.

In addition, the liquid crystal display device according to the second embodiment also achieves an effect of suppressing an increase in the black transmittance when an adjacent pixel performs black display, in the same manner as the first embodiment. FIG. 12 is a diagram illustrating a relationship between the planar electrode length of the wall electrode for each width of the cover electrode and black transmittance of an adjacent pixel in the liquid crystal display device according to the second embodiment of the present invention, and FIG. 13 is a diagram illustrating a relationship between the cover electrode width and the black transmittance of the adjacent pixel in the liquid crystal display device according to the second embodiment of the present invention. Hereinafter, there will be made a description of an effect of suppressing an increase in black transmittance when an adjacent pixel in the liquid crystal display device according to the second embodiment performs black display.

Here, in the graphs shown in FIG. 12, the graph r12, the graph r13, the graph r14, and the graph r15 respectively indicate black transmittance of the adjacent pixel with respect to the length L1 of the planar electrode PX2 in a case where the cover electrode width X1 is 0 μm, that is, the cover electrode is not provided, in a case where the cover electrode width X1 is 0.5 μm, in a case where the cover electrode width X1 is 2 μm, and in a case where the cover electrode width X1 is 4 μm. In addition, the graph r16 shown in FIG. 13 indicates a relationship between the cover electrode width X1 and the black transmittance of the adjacent pixel in a case where the electrode length L1 of the planar electrode PX2 forming the wall electrode PX is L1=2 μm.

As is clear from FIG. 12, even in a case where the length L1 of the planar electrode PX2 is 0 μm, that is, the planar electrode PX2 is not provided, as can be seen from the graph r13 to the graph r15, the black transmittance of the adjacent pixel is 0.9% when the cover electrode width X1 is 0.5 μm, the black transmittance the adjacent pixel is 0.19% at X1=2 μm, and the black transmittance the adjacent pixel is about 0.03% at X1=4 μm. On the other hand, in a case where the cover electrode width X1 is 0 μm, that is, the cover electrode CE is not provided, the black transmittance of the adjacent pixel is 1.2% at L1=0, it is also possible to suppress or reduce the black transmittance of the adjacent pixel by providing the cover electrode CE.

In addition, as is clear from the graph r13 to the graph r15 of FIG. 12, when the planar electrode PX2 having the electrode length L1 of 0.5 μm or more is formed, and the electrode length L1 is further increased, the black transmittance of the adjacent pixel is reduced according to the increase in the planar electrode length L1, and the cover electrode width X1 gradually approaches the black transmittance of the adjacent pixel at the cover electrode width X1 of 4 μm.

As such, in the liquid crystal display device according to the second embodiment as well, in the same manner as the first embodiment, if the planar electrode PX2 is lengthened, a distance between the wall electrode PX and the pseudo-wall electrode CT is shortened, and thus the electric flux lines LF reaching the liquid crystal layer LC forming the adjacent pixel are shielded by the planar electrode PX2. Therefore, an increase in the black transmittance of the adjacent pixel can be suppressed, and the electrode length L1 of the planar electrode PX2 is suitably 0.5 μm or more.

In addition, as is clear from the graph r16 of FIG. 13, in the relationship between the electrode width X1 of the cover electrode CE and the black transmittance of the adjacent pixel when the planar electrode of the wall electrode is 2 μm, the black transmittance of the adjacent pixel can be reduced by increasing the electrode width X1 of the cover electrode CE as described above, in the same manner as the case of increasing the width L1 of the planar electrode PX2. From this, the effect can be achieved only by providing the cover electrode CE even at the minimum width.

However, if the electrode width X1 of the cover electrode CE is increased, the display mode efficiency may be greatly reduced. This phenomenon becomes notable if the electrode width X1 of the cover electrode CE is longer than the electrode width L2 of the wall electrode PX, a fringe electric field which is an electric field in the vertical direction (tilt direction) easily occurs between the planar electrode PX2 and the cover electrode CE, and thus an electric field is difficult to apply between the wall electrode PX and the pseudo-wall electrode CT. From this, the cover electrode width X1 is preferably smaller than the wall electrode width L2 as X1≤L2.

Further, it can be seen that, as shown in FIG. 13, if the cover electrode width X1 is varied from 0.5 μm to 1.0 μm, the black transmittance of the adjacent pixel is reduced by 18% from 0.09 to 0.07, whereas if varied from 0 μm to 0.5 μm, the black transmittance of the adjacent pixel is reduced by 44% from 0.17 to 0.09. That is to say, if the cover electrode width X1 is 0.5 μm or more, the black transmittance of the adjacent pixel can be made to be 0.10 or less, and it is possible to efficiently shield the electric flux lines LF generated from the wires (drain lines DL and the gate lines) and the electric flux lines LF generated from the lower surface of the planar electrode PX2 of the white display pixel. From the above-described effects, the cover electrode width X1 is preferably in a range of 0.5≤X1≤L2 (μm).

This is because the electric flux lines LF generated from the wall electrode PX of the white display pixel reach the adjacent pixel through the lower part of the wire (the first substrate SUB1 side) if there is no cover electrode CE, whereas the electric flux lines LF passing around the cover electrode CE are shielded by the cover electrode CE if there is the cover electrode CE.

As such, the cover electrode CE achieves both effects of shielding a wire potential and suppressing black transmittance of an adjacent pixel.

From the above description, by providing the planar electrode PX2 even if the cover electrode CE is formed, the effects of lowering a driving voltage, improving the display mode efficiency, suppressing an increase in the black transmittance due to the wire potential, and suppressing an increase in the black transmittance of the adjacent pixel are achieved, and the cover electrode CE achieves effects of suppressing an increase in the black transmittance due to the wire potential and suppressing an increase in the black transmittance of the adjacent pixel.

However, the cover electrode CE may not be an electrode of 0 V, that is, may be in a floating state instead of a constant voltage. In a state where the cover electrode CE is in a floating state, there is concern that charge is accumulated in the cover electrode CE and black transmittance is increased during black display in the configuration in the related art shown in FIG. 5A. In contrast, in the second embodiment of the present invention, since the wall electrode PX includes the planar electrode PX2, the electric flux lines LF generated from the cover electrode CE where the charge is increased are shielded by the planar electrode PX2, and thus it is possible to suppress an increase in the black transmittance. Therefore, even if the cover electrode CE is in a floating state, there can be an achievement of effects of not only suppressing an increase in the black transmittance due to the charge increase, but also lowering a driving voltage, improving display mode efficiency, suppressing an increase in the black transmittance due to a wire potential, and suppressing an increase in black transmittance of an adjacent pixel, in the same manner as the above-described effects.

[Third Embodiment]

Figure 14:
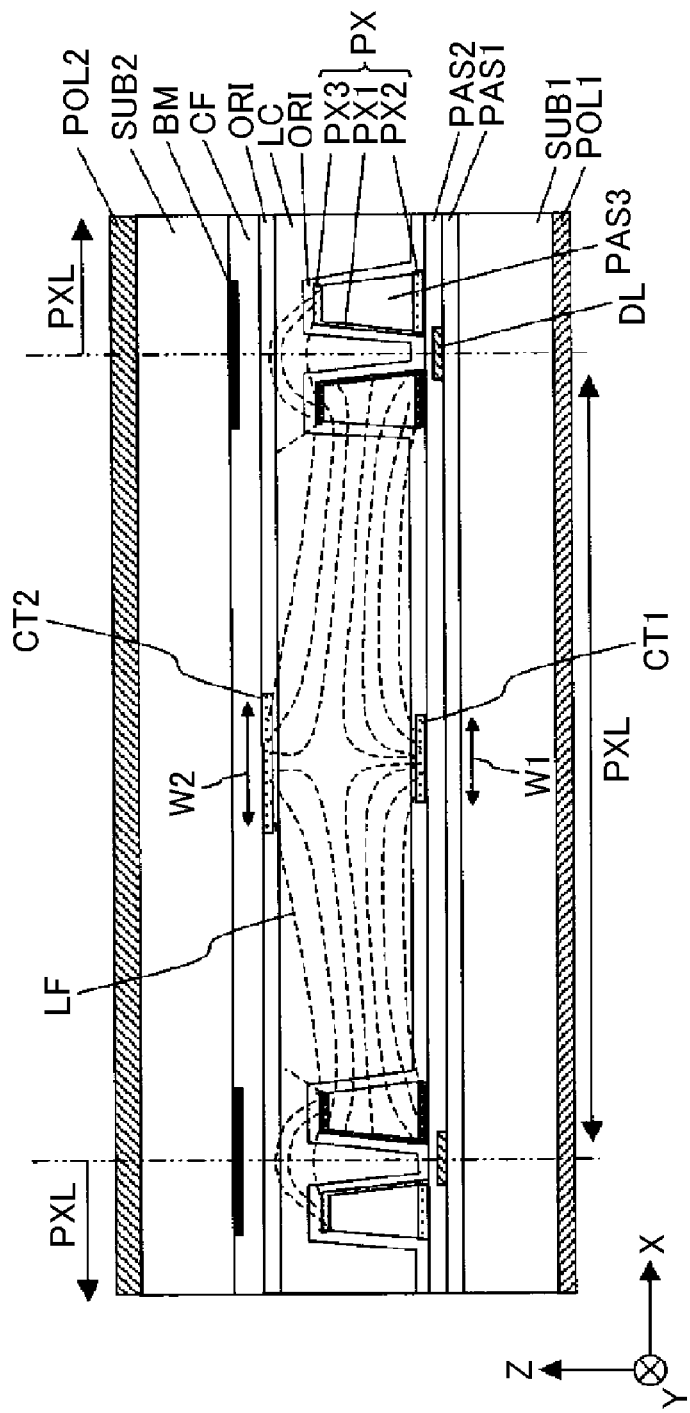
FIG. 14 is a cross-sectional view illustrating a pixel configuration in a liquid crystal display device according to a third embodiment of the present invention.
Figure 15:
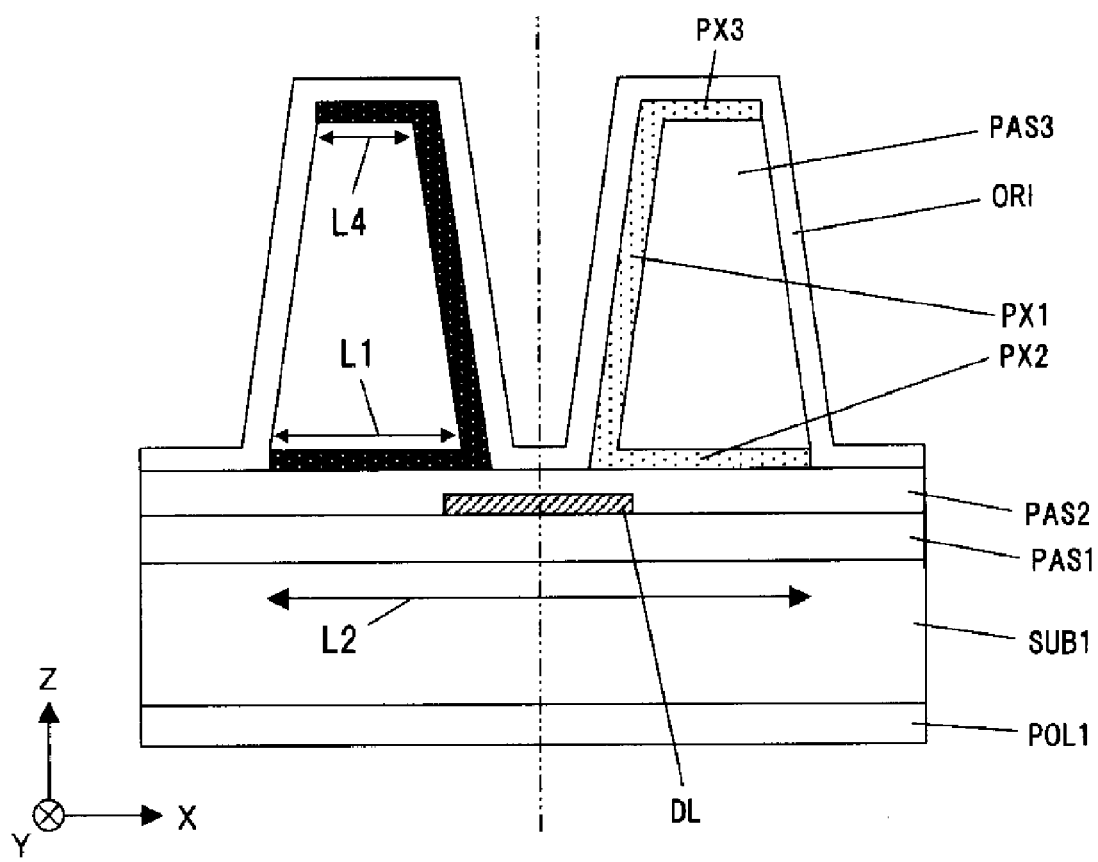
FIG. 15 is a cross-sectional view illustrating a detailed configuration of the wall electrode according to the third embodiment of the present invention.

FIG. 14 is a cross-sectional view illustrating a pixel configuration in a liquid crystal display device according to a third embodiment of the present invention, and FIG. 15 is a cross-sectional view illustrating a detailed configuration of the wall electrode according to the third embodiment of the present invention. Here, the liquid crystal display device according to the third embodiment is different from the liquid crystal display device according to the first embodiment only in the configuration of the wall electrode PX formed on the first substrate SUB1 side, and other configurations are the same. Hereinafter, in the following description, a configuration of the wall electrode PX will be described in detail. In addition, in the liquid crystal display device according to the third embodiment as well, although a case will be described in which the wall electrodes PX at both ends of the pixel PXL are pixel electrodes and the pseudo-wall electrode CT is a common electrode, the wall electrodes at both ends of the pixel PXL may be common electrodes and the pseudo-wall electrode may be a pixel electrode.

As shown in FIGS. 14 and 15, in the liquid crystal display device according to the third embodiment, the insulating layers PAS3 having a convex shape are formed in the region of the pixel PXL, and the wall-shaped electrodes PX1 are formed at side wall surfaces (outer wall surfaces) located at the boundaries of the pixel PXL in the side wall surfaces of the insulating layers PAS3. In addition, the planar electrode PX2 which is electrically connected to the wall-shaped electrode PX1 is formed at the lower layer side of the insulating layer PAS3, and a planar electrode (second planar electrode) PX3 which is electrically connected to the wall-shaped electrode PX1 is formed at the upper layer side of the insulating layer PAS3. Particularly, in the third embodiment, the planar electrode PX2 is formed at the lower surface (a surface of the first substrate SUB1 side) of the insulating layer PAS3, that is, between the insulating layer PAS2 and the insulating layer PAS3, and the planar electrode PX3 is formed on the upper surface side (a surface of the liquid crystal layer LC side, that is, an opposite surface side) of the insulating layer PAS3, that is, between the insulating layer PAS3 and the alignment layer ORI. At this time, of the edges of the planar electrodes PX2 and PX3, the edges on the wall-shaped electrode PX1 are consecutively formed with the edges of the wall-shaped electrode PX1 such that the wall-shaped electrode PX1 is electrically connected to the planar electrodes PX2 and PX3, thereby forming the wall electrode PX where they are disposed so as to be opposite to each other in the in-plane direction on the first substrate SUB1 side via the pseudo-wall electrode CT. Thereby, there is formation of the wall electrode PX having the planar electrodes PX2 and PX3 extending so as to protrude toward the pseudo-wall electrode CT from the edges of the wall-shaped electrode PX1 at the upper and lower ends of the wall-shaped electrode PX1. In other words, the liquid crystal display device according to the third embodiment has the planar electrode PX2 coming into contact with the first substrate SUB1 and the planar electrode PX3 close to the second substrate SUB2, and the planar electrodes PX2 and PX3 are formed extending toward the pseudo-wall electrode CT side which is a transmissive region of the pixel PXL, from the edges of the wall-shaped electrode PX1.

In relation to a formation process of the wall electrode PX according to the third embodiment, wires (drain line DL and the like) are formed at the upper layer of the insulating layer PAS1, the insulating layer PAS2 is formed so as to cover the wires, then a conductive thin film which will become the planar electrode PX2 is formed, and the planar electrode PX2 is formed through patterning. Next, the insulating layer PAS3 having a wall shape (convex shape) is formed at the upper layer of the planar electrode PX2, a transparent electrode is formed at the upper layer of the insulating layer PAS3, that is, the side wall surfaces and the upper surface, and the wall-shaped electrode PX1 and the planar electrode PX3 are formed. In this case, the wall electrode PX is formed so as not to be connected to the wall electrode PX of the adjacent pixel, that is, so as not to be electrically short-circuited, and the planar electrode PX2 and the wall-shaped transparent electrode (the wall-shaped electrode PX1) on the insulating layer are connected to each other on the pixel boundary side indicated by the two-dot chain line.

In other words, in the wall electrode PX according to the third embodiment, the pseudo-wall electrode CT (the linear electrodes CT1 and CT2) are formed extending in the longitudinal direction (Y direction) of the pixel PXL for each pixel PXL. In addition, the wall electrode PX to which the same image signal is supplied is formed at the edges in the longitudinal direction which are a pair of edges in the direction (X direction) perpendicular to the extending direction of the linear electrode CT1, via the thin film transistor TFT. At this time, in the wall electrode PX according to the third embodiment, as is clear from FIG. 15 which is a cross-sectional view in the transverse direction (XZ plane) of the pixel PXL, in the cross-sectional structure of the wall electrode PX, the wall-shaped electrode PX1 and the planar electrodes PX2 and PX3 forming the wall electrode PX are formed in a C shape, and an opening portion (a C-shaped opening portion) of the wall electrode PX is opened to the pseudo-wall electrode CT side.

With this configuration, the electric flux lines LF generated from the upper and lower planar electrodes PX2 and PX3 extending from the wall-shaped electrode PX1 can be bent abruptly by the electric flux lines LF generated from the wall-shaped electrode PX1, thus the number thereof reaching the pseudo-wall electrode CT becomes large, and thereby it is possible to suppress non-uniformity of the electric field intensity. As a result, the liquid crystal display device according to the third embodiment can achieve a notable effect that the display mode efficiency in all the pixels can be further improved in addition to the effects achieved by the liquid crystal display device according to the first embodiment. In addition, since the planar electrodes PX2 and PX3 are provided on the upper and lower sides of the wall-shaped electrode PX1, the effects of suppressing an increase in black transmittance due to a potential of the drain line DL which is a wire and suppressing an increase in black transmittance of an adjacent pixel can be improved.

From the above description, the liquid crystal display device according to the third embodiment can achieve novel effects in relation to lowering a driving voltage, improving display mode efficiency, suppressing an increase in black transmittance due to wire potential, and suppressing an increase in black transmittance of an adjacent pixel.

In addition, in the liquid crystal display device according to the third embodiment as well, the wall electrode PX may be formed as a metal thin film, and, in a case where the wall electrode PX is formed as a metal thin film as well, a yield of liquid crystal display devices is improved, and thereby it is possible to manufacture a liquid crystal display device at low costs, in the same manner as the first embodiment. However, in the case where the wall electrode PX according to the third embodiment is formed as a metal thin film, in the same manner as the first embodiment, the width of two wall electrodes PX disposed so as to be close to the pixel boundary portion indicated by the two-dot chain line is preferably smaller than the width of the black matrix.

Figure 16:
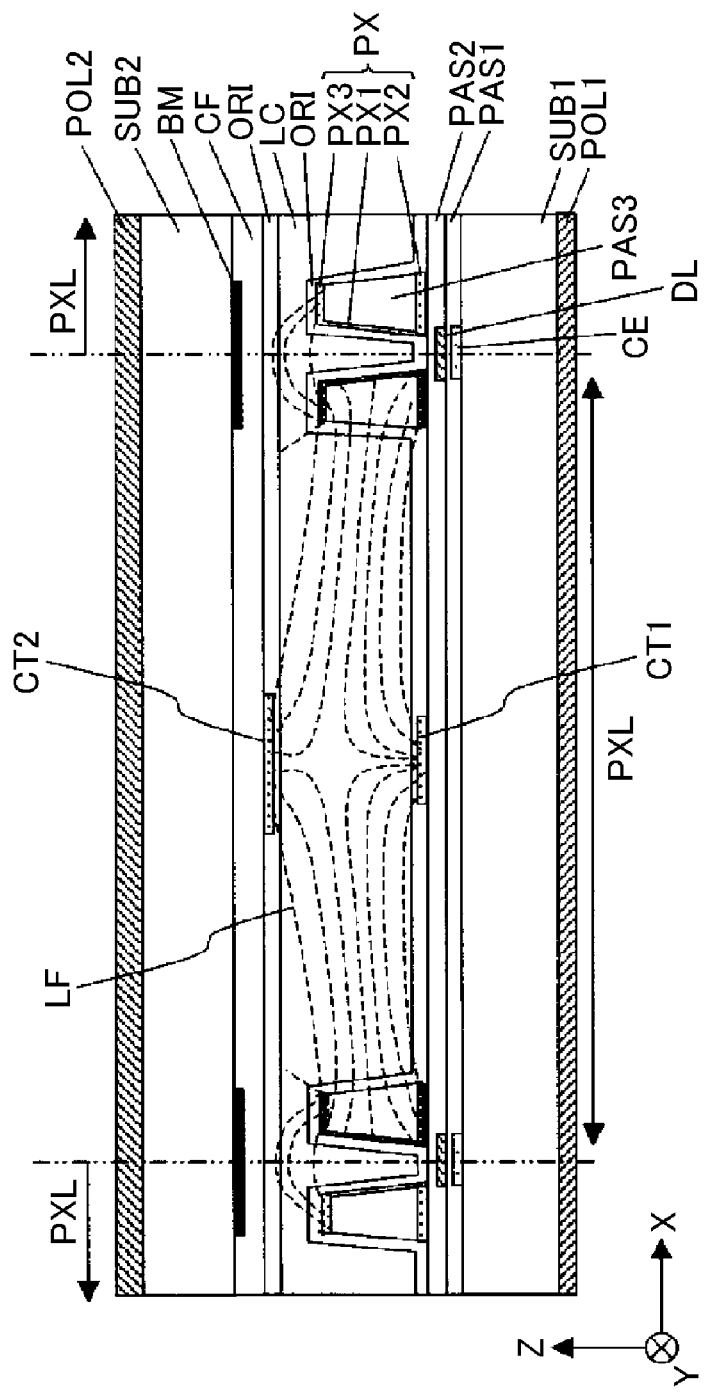
FIG. 16 is a cross-sectional view illustrating a pixel configuration in another liquid crystal display device according to the third embodiment of the present invention.

Further, as shown in the cross-sectional view illustrating a pixel configuration in another liquid crystal display device according to the third embodiment of the present invention shown in FIG. 16, the cover electrode CE which is the same as in the second embodiment may be provided at the lower layer of a wire (for example, the drain line DL).

In another liquid crystal display device shown in FIG. 16, the cover electrode CE is disposed at the lower layer side of the drain line DL which is a wire via the insulating layer PAS1. In other words, the insulating layer PAS1 is formed so as to cover the cover electrode CE which is formed on the liquid crystal layer LC side (opposite surface side) of the first substrate SUB1, and the drain line DL is formed at the upper layer of the insulating layer PAS1. At this time, the cover electrodes CE are formed so as to overlap the drain lines DL, extend in the Y direction along with the drain lines DL, and are arranged in parallel to each other in the X direction.

In this case, a configuration of the upper layer of the drain line DL is the same as that of the above-described liquid crystal display device shown in FIG. 14, the insulating layer PAS2 covering the surface of the first substrate SUB1 including the drain line DL, the insulating layer PAS3 forming a step difference, the wall-shaped electrode PX1 and the planar electrodes PX2 and PX3 forming the wall electrode PX, and the linear electrode CT1 forming the pseudo-wall electrode CT, are formed, and, the alignment layer ORI is formed thereon so as to cover the liquid crystal layer LC side of the first substrate SUB1. The first substrate SUB1 is disposed so as to be opposite to the second substrate SUB2 via the liquid crystal layer LC, thereby forming the liquid crystal display panel PNL. In other words, in the same manner as the liquid crystal display device according to the second embodiment, the wire (drain line DL) is disposed at the layer between the wall electrode PX of the pixel PXL and the cover electrode CE.

Therefore, in another liquid crystal display device according to the third embodiment shown in FIG. 16, in addition to the effects achieved by the liquid crystal display device according to the third embodiment shown in FIG. 15, there can be an achievement of a notable effect where the cover electrode CE can suppress occurrence of electric flux lines LF reaching the wall electrode PX from the drain line DL via the liquid crystal layer LC.

[Fourth Embodiment]

Figure 17:
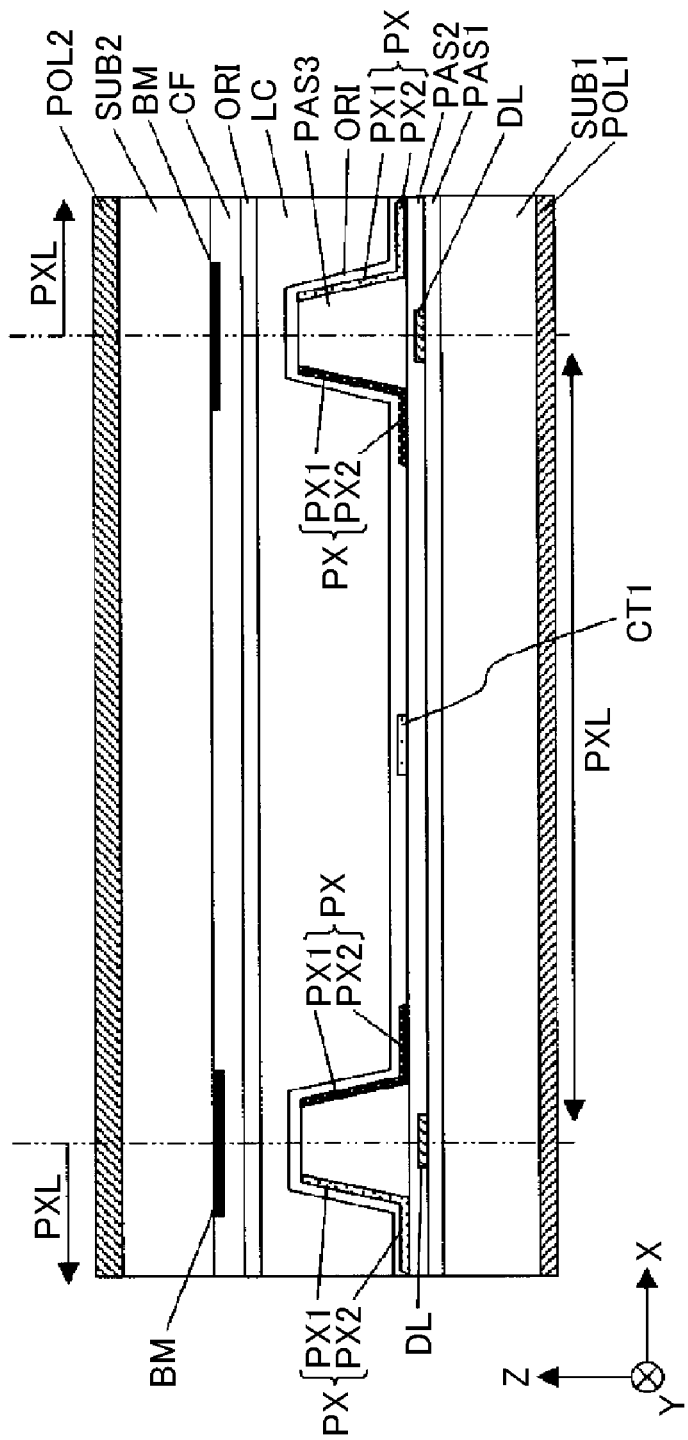
FIG. 17 is a cross-sectional view illustrating a pixel configuration in a liquid crystal display device according to a fourth embodiment of the present invention.

FIG. 17 is a cross-sectional view illustrating a pixel configuration in a liquid crystal display device according to a fourth embodiment of the present invention, which is different from the liquid crystal display device according to the first embodiment only in a configuration of the common electrode to which a common signal is supplied, and other configurations are the same. Therefore, in the following description, a configuration of the common electrode will be described in detail.

As shown in FIG. 17, the common electrode according to the fourth embodiment has a configuration where the linear electrode CT2 on the second substrate SUB2 side of a pair of linear electrodes CT1 and CT2 forming the pseudo-wall electrode CT which is a common electrode according to the first embodiment is omitted. In other words, in the same manner as the first embodiment, the insulating layer PAS3 is formed along the boundary portion with the adjacent pixel PXL, and at least wall electrode PX is formed by the wall-shaped electrode PX1 formed at the side wall surface of the insulating layer PAS3 and the planar electrode PX2 extending from the end portion of the wall-shaped electrode PX1 in the in-plane direction of the first substrate SUB1. On the other hand, the linear electrode CT1 which is a common electrode is formed in a region between a pair of wall electrodes PX disposed so as to be opposite to each other in the X direction, extends in the region of the pixel PXL in the Y direction, and is formed only on the first substrate SUB1 side. Therefore, in the configuration according to the fourth embodiment, a process for forming the linear electrode CT2 on the second substrate SUB2 is unnecessary, and thus it is possible to manufacture a liquid crystal display device at low costs.

In the pixel configuration according to the fourth embodiment as well, since electric flux lines generated from the lower end portion of the wall-shaped electrode PX1 reach the linear electrode CT1, and electric flux lines generated from the planar electrode PX2 also reach the linear electrode CT1, the same effects as in the first embodiment can be achieved, and thus it is possible to lower the driving voltage, to improve display mode efficiency, to suppress an increase in black transmittance due to a wire potential, and to suppress an increase in black transmittance of an adjacent pixel.

In addition, the wall electrodes PX are formed along the edge of the pixel PXL, and the linear electrode CT1 is formed in the region between the wall electrodes PX. Therefore, even in a case where the pixel width in the X direction in FIG. 17 is increased, a gap (a distance between the electrodes) between the wall electrode PX which is a pixel electrode to which an image signal is supplied and the linear electrode CT1 which is a common electrode to which a common signal is supplied can be made to be about half of the pixel width. As a result, there can be an achievement of an effect that non-uniformity of electric field intensity in the same pixel can be suppressed.

In the configuration according to the fourth embodiment, since only the color filters or the black matrices BM are formed in the second substrate SUB2, it is possible to form a liquid crystal display panel with the same position alignment accuracy as in the related art. As a result, it is possible to reduce the percentage of defects accompanied by joining of the first substrate SUB1 and the second substrate SUB2 together, and thus a notable effect of improving a yield can be achieved, thereby manufacturing a liquid crystal display device at low cost.

Figure 18:
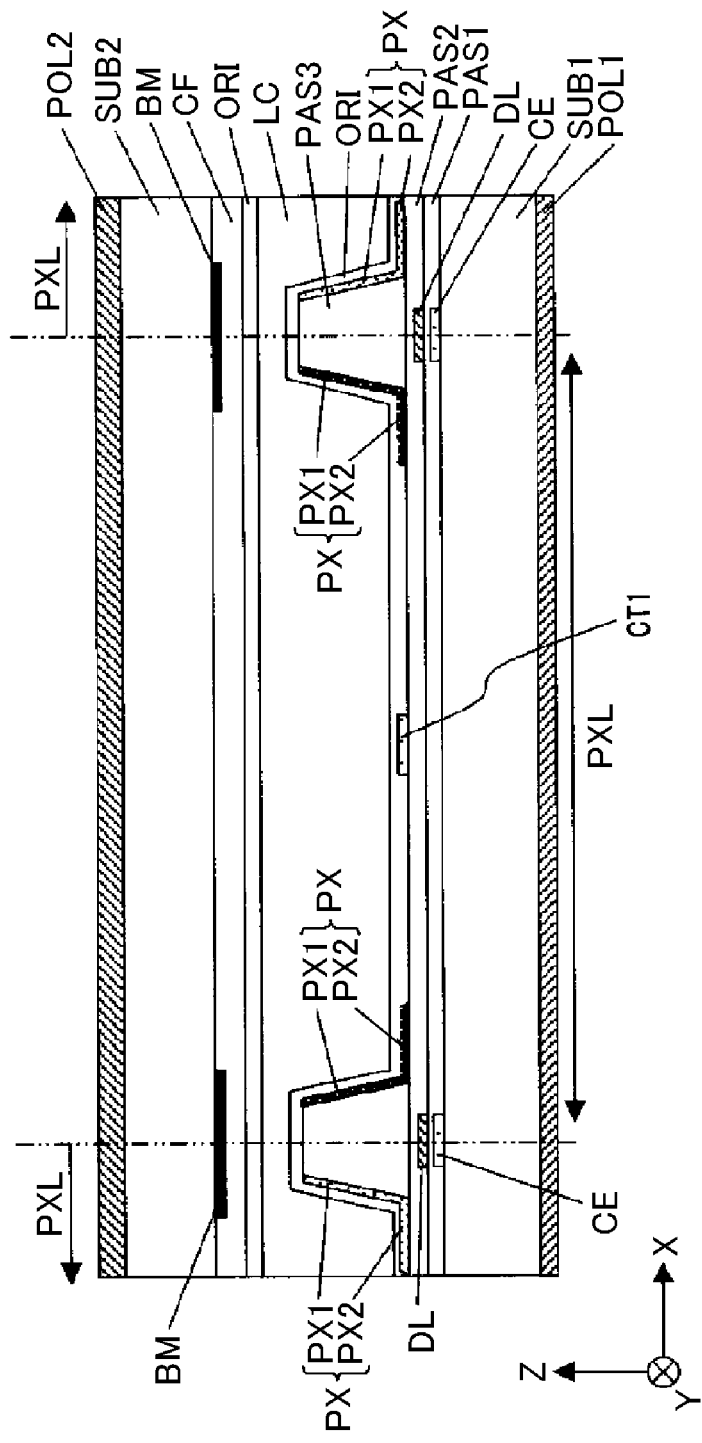
FIG. 18 is a cross-sectional view illustrating a pixel configuration in another liquid crystal display device according to the fourth embodiment of the present invention.

As shown in the cross-sectional view illustrating a pixel configuration in another liquid crystal display device of the fourth embodiment of the present invention shown in FIG. 18, the cover electrode CE may be provided at the lower layer of a wire (for example, the drain line DL) in the same manner as the second embodiment.

In another liquid crystal display device shown in FIG. 18 as well, the cover electrode CE is disposed at the lower layer side of the drain line DL which is a wire via the insulating layer PAS1. At this time, a configuration of the upper layer of the drain line DL is the same as that in the liquid crystal display device shown in FIG. 16, the wall-shaped electrodes PX1 are respectively formed at the side wall surfaces of the insulating layer PAS3 formed at the upper layer of the cover electrode CE and the drain line DL, and the planar electrode PX2 extending in the in-plane direction of the first substrate SUB1 is formed at the end portion of each wall-shaped electrode PX1, thereby forming the wall electrode PX. In addition, the linear electrode CT1 is formed in the intermediate region between the wall electrodes PX.

Therefore, in another liquid crystal display device according to the fourth embodiment shown in FIG. 18, in addition to the effects achieved by the liquid crystal display device according to the fourth embodiment shown in FIG. 17, it is possible to achieve a notable effect that the cover electrode CE can suppress occurrence of electric flux lines LF reaching the wall electrode PX from the drain line DL via the liquid crystal layer LC.

[Fifth Embodiment]

Figure 19:
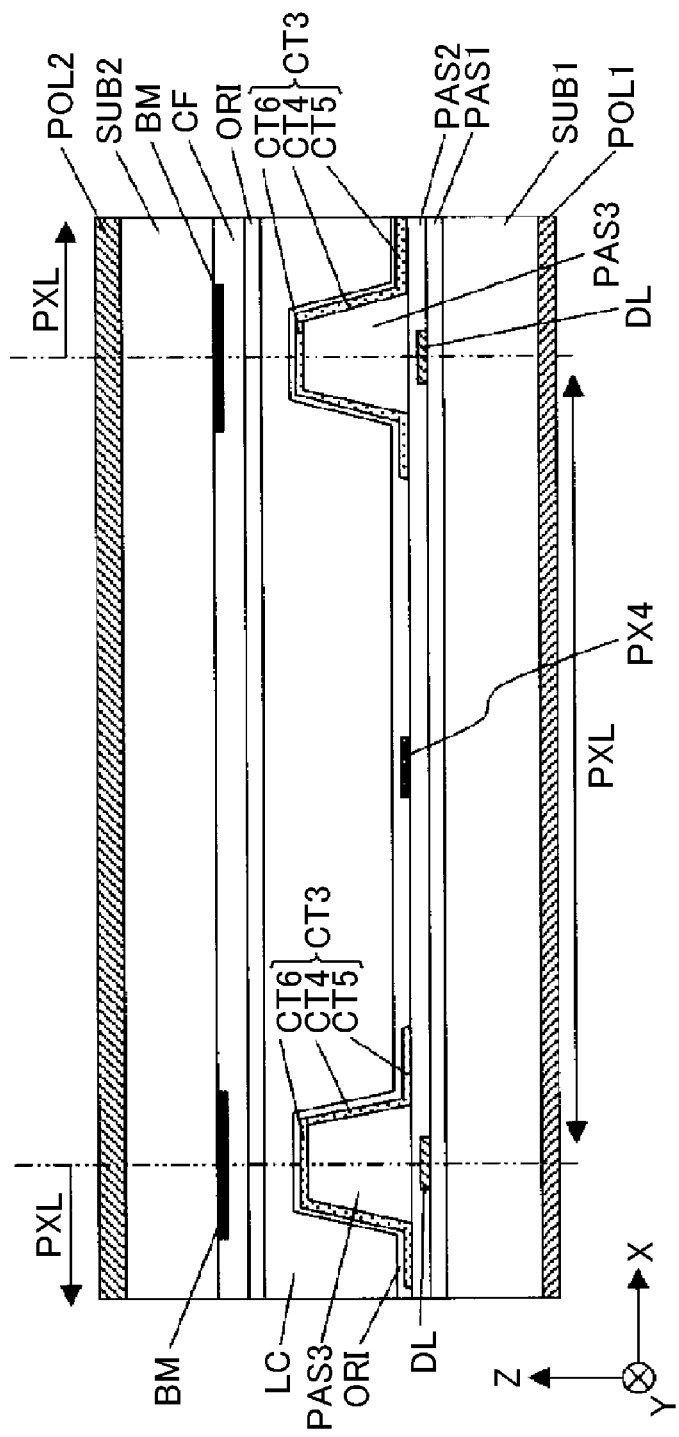
FIG. 19 is a cross-sectional view illustrating a pixel configuration in a liquid crystal display device according to a fifth embodiment of the present invention.

FIG. 19 is a cross-sectional view illustrating a pixel configuration in a liquid crystal display device according to a fifth embodiment of the present invention. In the fifth embodiment, a wall electrode at the pixel boundary is a common electrode, and a central electrode between the wall electrodes is a pixel electrode. In addition, configurations other than a configuration of the common wall electrode CT3 which is a common electrode are the same as in the fourth embodiment, and, in the following description, the common wall electrode CT3 will be described in detail.

As shown in FIG. 19, in the liquid crystal display device according to the fifth embodiment, the insulating layer PAS3 is formed exceeding the pixel boundary with the adjacent pixel indicated by the two-dot chain line, and wall electrodes CT4 is formed at the side wall surfaces thereof. An electrode having a planar shape (planar electrode) CT5 extending in the in-plane direction of the first substrate SUB1 is consecutively formed from the wall-shaped electrode CT4 with a predetermined width at the end portion on the lower end side of the wall-shaped electrode CT4, that is, the end portion on the first substrate SUB1 side. At this time, the planar electrode (first planar electrode) CT5 is formed along the upper surface of the insulating layer PAS2.

Further, an electrode (planar electrode) CT6 formed from conductive thin film is formed on the upper surface of the insulating layer PAS3, that is, the surface on the second substrate SUB2 side, and the end portion of the planar electrode CT6 is connected to the end portion (the end portion on the second substrate SUB2 side) on the upper end side of the wall-shaped electrode CT4. The wall-shaped electrode CT4 and the planar electrodes CT5 and CT6 form the common wall electrode CT3. In addition, a shape of the planar common electrode CT5 is a shape of the upper surface of the insulating layer PAS3.

As such, in the fifth embodiment, since a common signal is applied to the common wall electrode CT3 formed between the adjacent pixels, the common wall electrodes CT3 of one of the adjacent pixels PXL in a pair of common wall electrode CT3 formed at the edge of the pixel are integrally formed at the upper surface of the insulating layer PAS3 and are electrically connected to each other. In other words, the common wall electrodes CT3 are formed so as to cover the insulating layer PAS3.

On the other hand, the pixel electrode PX according to the fifth embodiment is formed from the linear electrode PX4 formed of a transparent conductive film extending in the Y direction in FIG. 19, that is, the longitudinal direction of the pixel PXL, and is formed in a region between a pair of common wall electrodes CT3 of each pixel PXL.

As such, in the liquid crystal display device according to the fifth embodiment as well, the electrode (the linear electrode PX4 which is the pixel electrode PX) is formed only on the first substrate SUB1 in the region between the common wall electrodes CT3. Therefore, in the same manner as the fourth embodiment, a notable effect of improving a yield in manufacturing a liquid crystal display panel can be achieved. As a result, a notable effect of manufacturing a liquid crystal display device at low cost can be achieved.

Further, in the liquid crystal display device according to the fifth embodiment, the common wall electrodes CT3 which are formed so as to cover the insulating layer PAS3 and to which a common signal is supplied, that is, the common wall electrodes CT3 at the pixel boundary portion are entire surface common electrodes. Therefore, it is possible to increase an area of the common wall electrodes CT3 taking up an area of the display surface of the liquid crystal display panel PNL, and to thereby suppress electric flux lines from the adjacent pixels, and thereby there can be an achievement of notable effects of suppressing an increase in the black transmittance of the adjacent pixel and further suppressing a variation in the transmittance due to a variation in the adjacent pixel potential.

In addition, the electric flux lines LF generated from the linear electrode PX4 which is the pixel electrode PX are parallel to the in-plane direction of the first substrate SUB1 and reach the common wall electrodes CT3. At this time, since the planar electrode CT5 forming the common wall electrode CT3 can suppress electric flux lines from the wire such as the drain line DL, the same effects as in the fourth embodiment can be achieved, and thus it is possible to lower a driving voltage, to improve display mode efficiency, and to suppress an increase in black transmittance due to a wire potential.

Figure 20:
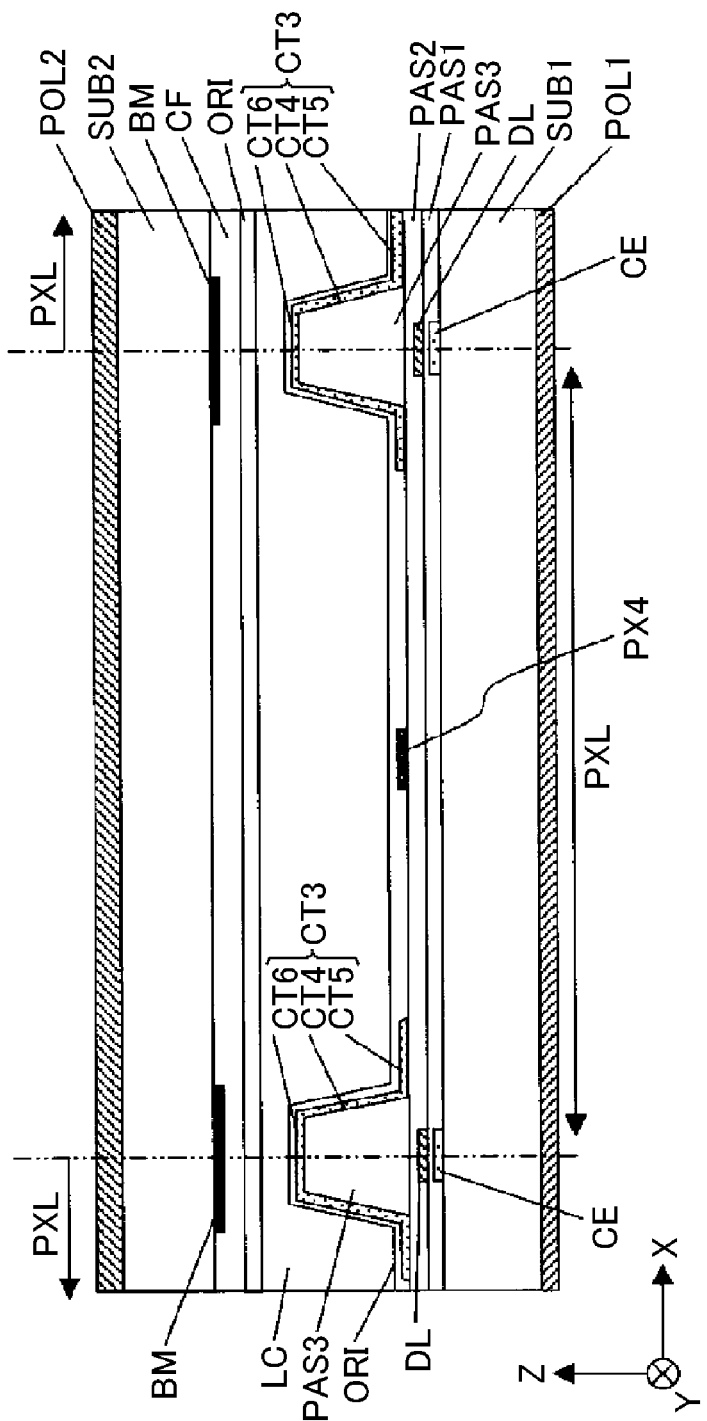
FIG. 20 is a cross-sectional view illustrating a pixel configuration in another liquid crystal display device according to the fifth embodiment of the present invention.

As shown in the cross-sectional view illustrating a pixel configuration in another liquid crystal display device of the fifth embodiment of the present invention shown in FIG. 20, the cover electrode CE may be provided at the lower layer of a wire (for example, the drain line DL) in the same manner as the second embodiment.

In another liquid crystal display device according to the fifth embodiment shown in FIG. 20, the cover electrode CE is disposed at the lower layer side of the drain line DL which is a wire via the insulating layer PAS1. At this time, a configuration of the upper layer of the drain line DL is the same as that in the liquid crystal display device shown in FIG. 19, a pair of common wall electrodes CT3 are formed so as to cover the insulating layer PAS3 formed at the pixel boundary portion, each common wall electrode CT3 is formed by the common wall electrode CT4 and the planar common electrodes CT5 and CT6, and the linear electrode PX4 is formed between a pair of common wall electrodes CT3.

Therefore, in another liquid crystal display device according to the fifth embodiment shown in FIG. 20 as well, in addition to the effects achieved by the liquid crystal display device according to the fifth embodiment shown in FIG. 19, it is possible to achieve a notable effect that the cover electrode CE can suppress occurrence of electric flux lines LF reaching the wall electrode PX from the drain line DL via the liquid crystal layer LC.

[Sixth Embodiment]

Figure 21:
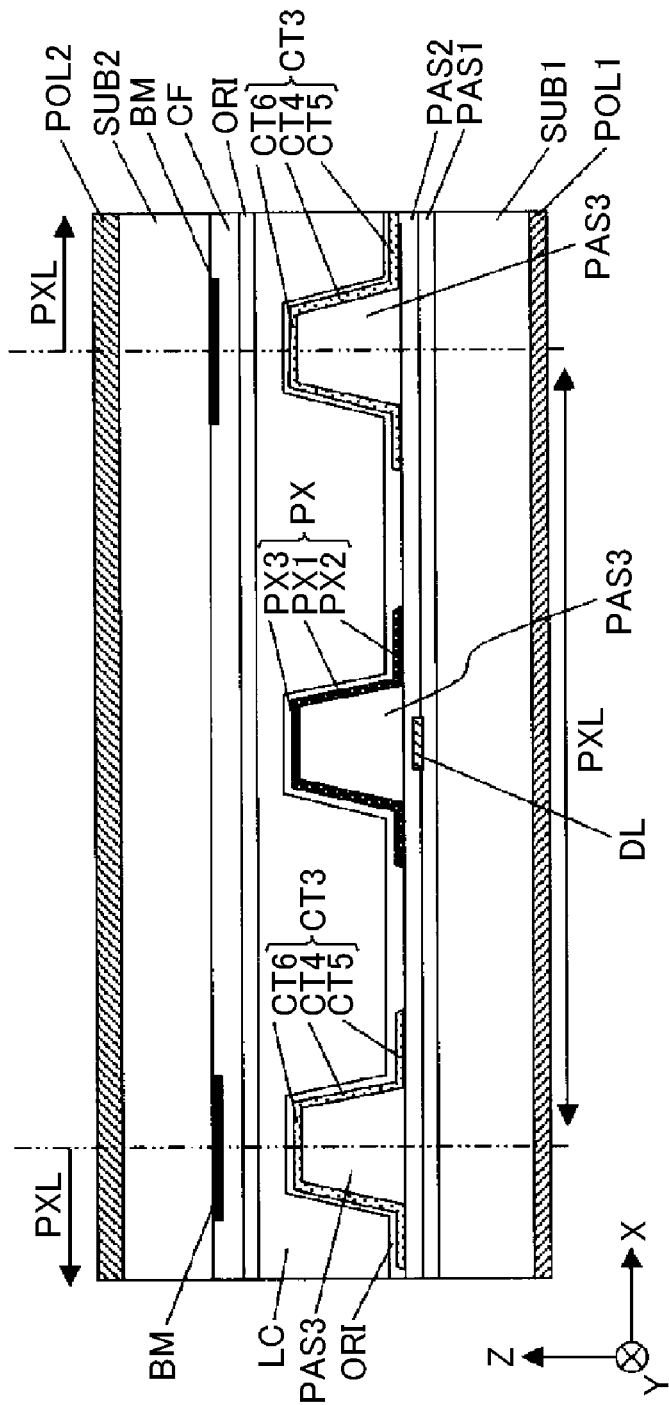
FIG. 21 is a cross-sectional view illustrating a pixel configuration in a liquid crystal display device according to a sixth embodiment of the present invention.

FIG. 21 is a cross-sectional view illustrating a pixel configuration in a liquid crystal display device according to a sixth embodiment of the present invention, and configurations other than a configuration of the wall electrode PX which is a pixel electrode and a formation position of the drain line DL are the same as in the fifth embodiment. Therefore, in the following description, a configuration of the wall electrode PX and the drain line DL will be described in detail.

As shown in FIG. 21, the insulating layer PAS3 which protrudes in a convex shape is formed on the opposite surface side of the first substrate SUB1 in the region of each pixel as well as the boundary portion with adjacent pixel, and a conductive thin film is formed so as to cover the insulating layer PAS3. In other words, in the sixth embodiment, the wall electrode is formed in the region (transmissive region) of the pixel PXL as well as the edge of the pixel PXL. However, of the conductive thin films covering the insulating layers PAS3, at least the conductive thin film covering the insulating layer PAS3 formed at the boundary portion with the adjacent pixel, that is, the insulating layer PAS3 formed inside the pixel region is transparent.

In the liquid crystal display device according to the sixth embodiment, the conductive thin film covering the insulating layer PAS3 formed at the boundary portion with the adjacent pixel is a common electrode (common wall electrode) CT3 to which a common signal is supplied, and the conductive thin film covering the insulating layer PAS3 formed in the region between a pair of common wall electrode CT3, that is, the pixel region, is a pixel electrode (wall electrode PX) to which an image signal is supplied via the thin film transistor.

At this time, the wall electrode PX and the common wall electrode CT3 are formed by the wall-shaped electrodes PX1 and CT4 formed at the side wall surfaces of the insulating layers PAS3, the planar electrodes PX2 and CT5 formed extending from the lower end sides of the wall-shaped electrodes PX1 and the CT4 in the in-plane direction of the first substrate SUB1, and the planar electrodes PX3 and CT6 formed so as to cover the top portions of the insulating layer PAS3 from the upper end sides of the wall-shaped electrodes PX1 and CT4. In other words, in the sixth embodiment, the wall electrode PX which is a pixel electrode is formed in the region between a pair of wall electrodes CT.

In addition, in the sixth embodiment, the drain line DL is disposed at the lower layer of the wall electrode PX, that is, at the lower layer of the insulating layer PAS3 where the wall electrode PX is formed, via the insulating layer PAS2. In addition, the wall electrode PX extending in the Y direction is formed almost at the center portion in the X direction of FIG. 21, that is, in the transverse direction of the pixel PXL. Therefore, in regions other than the formation region of the thin film transistor, each pixel electrode PX is symmetric to the drain line DL, that is, the wall electrode PX, in the X direction of FIG. 21, that is, in the transverse direction of the pixel PXL.

At this time, in the sixth embodiment as well, since the electrodes are formed only on the first substrate SUB1 side, the same effects as in the fifth embodiment can be achieved, and thus it is possible to improve a yield in manufacturing a liquid crystal display panel, and to thereby lower manufacturing costs of a liquid crystal display device.

In the liquid crystal display device according to the sixth embodiment as well, since the common wall electrode CT3 is formed at the boundary portion with the adjacent pixel, the same effects as in the fifth embodiment can be achieved, and thus it is possible to lower a driving voltage, to improve display mode efficiency, to suppress an increase in black transmittance due to a wire potential, to suppress an increase in black transmittance of an adjacent pixel, and to suppress a variation in the transmittance due to a variation in the adjacent pixel potential.

Particularly, in the liquid crystal display device according to the sixth embodiment, since the wall electrode PX is formed in the region between a pair of common wall electrodes CT3, a gap between the pixel electrode and the common electrode, that is, a gap between the wall electrode PX and the common wall electrode CT3 can be made to be smaller than a gap between the pixels PXL in the transverse direction, and thus it is possible to make distribution of electric flux lines occurring between the wall electrode PX and the common wall electrode CT3 uniform. In addition, in both the wall electrode PX and the common wall electrode CT3, the planar electrodes PX2 and CT5 are formed which respectively extend from the lower end sides of the wall-shaped electrodes PX1 and CT4 in the in-plane direction of the first substrate SUB1, that is, in the in-plane direction of each pixel PXL. Therefore, in both of the wall electrode PX and the common wall electrode CT3, it is possible to suppress electric flux lines from the lower side portions of the wall-shaped electrodes PX1 and CT4 from turning around the drain line DL or the adjacent pixel via the liquid crystal layer LC.

In addition, although, in the liquid crystal display device according to the sixth embodiment, the wall electrode PX is provided at the center of the pixel PXL, and the drain line DL formed from a metal wire is provided in the region overlapping the wall electrode PX, the liquid crystal molecules is hardly moved in the liquid crystal layer LC of the region overlapping the planar electrode PX3 forming the wall electrode PX, and thus the drain line DL may be formed from a metal thin film having low transistor. In addition, a formation position of the drain line DL is limited to the position overlapping the wall electrode PX, and the drain line DL may be formed in the region overlapping the common wall electrode CT3 in the same manner as the above-described first to fifth embodiments.

Figure 22:
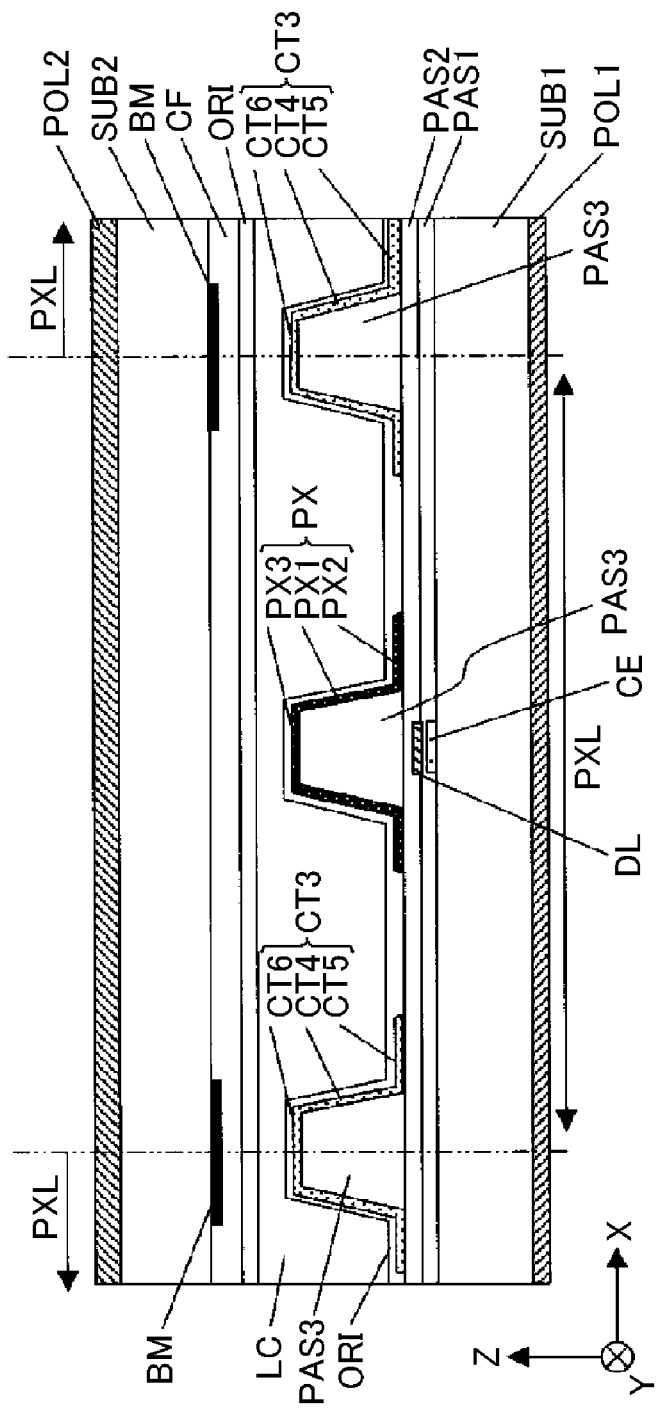
FIG. 22 is a cross-sectional view illustrating a pixel configuration in another liquid crystal display device according to the sixth embodiment of the present invention.

As shown in the cross-sectional view illustrating a pixel configuration in another liquid crystal display device of the sixth embodiment of the present invention shown in FIG. 22, the cover electrode CE may be provided at the lower layer of a wire (for example, the drain line DL) in the same manner as the second embodiment.

In another liquid crystal display device according to the sixth embodiment shown in FIG. 22, the cover electrode CE is disposed at the lower layer side of the drain line DL which is a wire via the insulating layer PAS1. At this time, a configuration of the upper layer of the drain line DL is the same as that in the liquid crystal display device shown in FIG. 21, a pair of common wall electrodes CT3 formed by the wall-shaped electrode CT4 and the planar electrodes CT5 and CT6 are formed at the edge of the pixel PXL so as to cover the insulating layer PAS3, and the wall electrode PX formed by the wall-shaped electrode PX1 and the planar electrodes PX2 and PX3 are formed in the region between a pair of common wall electrodes CT3.

Therefore, in another liquid crystal display device according to the sixth embodiment shown in FIG. 22 as well, in addition to the effects achieved by the liquid crystal display device according to the sixth embodiment shown in FIG. 21, it is possible to achieve a notable effect that the cover electrode CE can suppress occurrence of electric flux lines LF reaching the wall electrode PX from the drain line DL via the liquid crystal layer LC.

[Seventh Embodiment]

Figure 23:
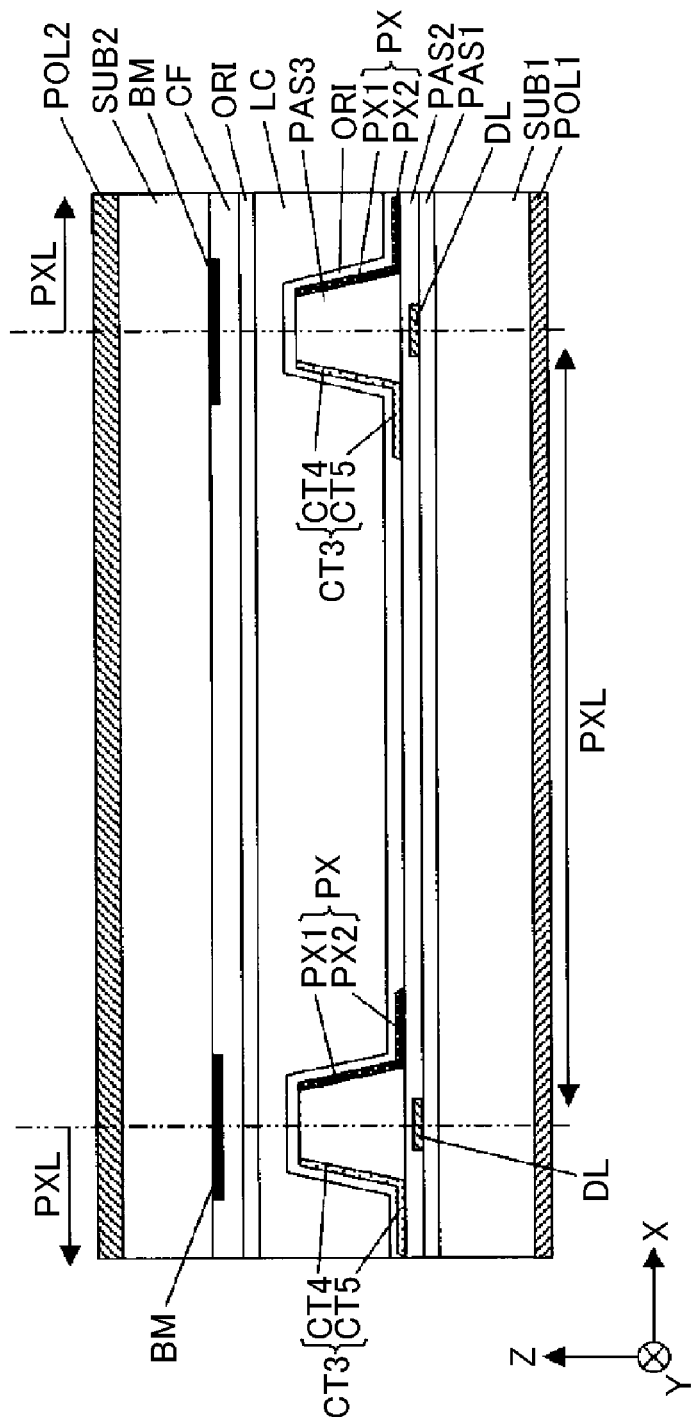
FIG. 23 is a cross-sectional view illustrating a pixel configuration in a liquid crystal display device according to a seventh embodiment of the present invention.

FIG. 23 is a cross-sectional view illustrating a pixel configuration in a liquid crystal display device according to a seventh embodiment of the present invention, and configurations other than a common electrode formed by the wall electrode are the same as in the first embodiment. Therefore, in the following description, a configuration of the wall electrode (common wall electrode) CT3 forming a common electrode will be described in detail.

As shown in FIG. 23, in the liquid crystal display device according to the seventh embodiment, the pseudo-wall electrode according to the above-described first embodiment is not used, and one of a pair of wall electrodes is used a pixel electrode, and the other thereof is used as a common electrode. That is to say, of the wall electrodes formed at a pair of edges of the pixel PXL, one wall electrode PX is used as a pixel electrode to which an image signal is supplied, and the other wall electrode (common wall electrode) CT3 is used as a common electrode to which a common signal is supplied.

In the pixel configuration according to the seventh embodiment having the configuration, of the side wall surfaces in the X direction side of the insulating layer PAS3 which is formed in a convex shape so as to extend in the Y direction at the edge of each pixel PXL, the wall electrode PX formed by the wall-shaped electrode PX1 and the planar electrode PX2 is formed at one side wall surface, and an image signal is supplied to the wall electrode PX via the thin film transistor (not shown). In addition, the common wall electrode CT3 formed by the wall-shaped electrode CT4 and the planar electrode CT5 is formed at the other side wall surface, and is supplied with a common signal. The insulating layer PAS3 having this configuration is disposed at the boundary portion with the adjacent pixel PXL so as to overlap the drain line DL, and thus a pair of wall electrode PX and common wall electrode CT3 are disposed so as to be opposite to each other in the region of each pixel PXL.

As such, in the wall electrode PX and the common wall electrode CT3 according to the seventh embodiment, the wall-shaped electrodes PX1 and the CT4 which stand from the surface of the first substrate SUB1 toward the second substrate SUB2 are formed, and the planar electrodes PX2 and CT5 which extend from the edges on the first substrate SUB1 side of the wall-shaped electrodes PX1 and CT4 in the in-plane direction of the first substrate SUB1 are formed. As a result, the liquid crystal display device according to the seventh embodiment can achieve the same effects as in the first embodiment. In other words, it is possible to prevent (shield) electric flux lines generated from the wall-shaped electrode PX1 from heading toward the adjacent pixel or the drain line DL via the liquid crystal layer LC side by the planar electrode PX2, and electric flux lines generated from the planar electrode PX2 can reach the common wall electrode CT3. In a similar manner, in the common wall electrode CT3 as well, it is possible to prevent (shield) electric flux lines generated from the adjacent pixel or the drain line DL from reaching the wall-shaped electrode CT4 via the liquid crystal layer LC by the planar electrode CT5, and electric flux lines generated from the wall electrode PX can reach the planar electrode CT5. Therefore, in the liquid crystal device according to the seventh embodiment as well, non-uniformity of the electric field intensity in the pixel PXL can be suppressed.

In addition, in the pixel configuration according to the seventh embodiment, since it is not necessary to form a linear electrode for forming a pseudo-wall electrode at the center portion of each pixel PXL in the first substrate SUB1 and the second substrate SUB2, it is possible to reduce the number of steps necessary for manufacturing the first substrate SUB1 and the second substrate SUB2, and thus a notable effect of manufacturing a liquid crystal display device at low costs can be achieved.

Particularly, in the liquid crystal display device according to the seventh embodiment, the wall electrode PX and the common wall electrode CT3 extending in the longitudinal direction of each pixel PXL are formed, and the wall electrode PX and the common wall electrode CT3 are disposed so as to be opposite to each other in the transverse direction. Therefore, if the present invention is applied to a high definition liquid crystal display panel, it is possible to shorten (decrease) the gap between the wall electrode PX and the second wall electrode CT3, to thereby apply a uniform electric field between the wall electrode PX and the second wall electrode CT3, and thus display mode efficiency can be improved.

However, in the pixel configuration according to the seventh embodiment, if the gap between the wall electrode PX and the common wall electrode CT3 is lengthened (increased), the electric flux lines become dense in terms of the density around the wall electrode PX and the common wall electrode CT3, and become sparse at a region distant from the wall electrode PX and the common wall electrode CT3. For this reason, there is concern that the electric field intensity between the wall electrode PX and the common wall electrode CT3 is non-uniform, and thus the display mode efficiency is reduced. Therefore, a distance between the wall electrode PX and the common wall electrode CT3 is preferably selected in a range capable of obtaining high display mode efficiency, which is suitable for a small-sized and high definition liquid crystal display panel PNL. In addition, since the wall electrode PX and the common wall electrode CT3 according to the seventh embodiment respectively include the planar electrodes PX2 and CT5, the same effects as in the first embodiment can be achieved, and thus it is possible to lower a driving voltage, to improve display mode efficiency, to suppress an increase in black transmittance due to a wire potential, and to suppress an increase in black transmittance of an adjacent pixel.

In addition, although, in the pixel configuration according to the seventh embodiment, of the side wall surfaces of the single insulating layer PAS3, the pixel electrode (wall electrode) PX to which an image signal is supplied is formed at one side wall surface, and the common electrode (common wall electrode) CT3 is formed at the other side wall surface, formation positions of the pixel electrode and the common electrode are not limited to the disposition according to the seventh embodiment. For example, the wall electrode PX may be entirely formed at the side wall surfaces of odd numbered insulating layers PAS3 in the X direction, and the common wall electrode CT3 may be entirely formed at the side wall surfaces of even numbered insulating layers PAS3. With this configuration, the pixel electrodes or the common electrodes of the adjacent pixels PXL are disposed to be close to each other in the same insulating layer PAS3, and thus it is possible to achieve a notable effect of preventing a potential difference from occurring between the common wall electrodes CT3 of the adjacent pixels.

Figure 24:
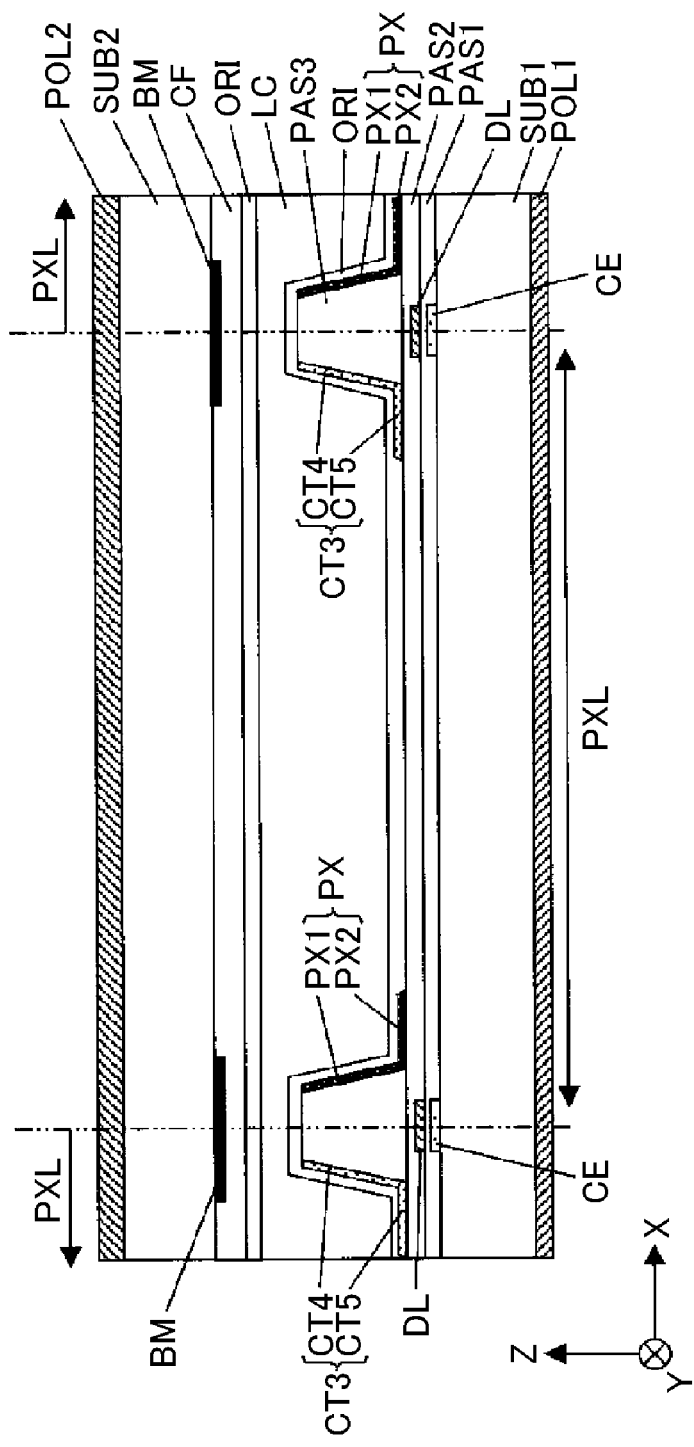
FIG. 24 is a cross-sectional view illustrating a pixel configuration in another liquid crystal display device according to the seventh embodiment of the present invention.

As shown in the cross-sectional view illustrating a pixel configuration in another liquid crystal display device of the seventh embodiment of the present invention shown in FIG. 24, the cover electrode CE may be provided at the lower layer of a wire (for example, the drain line DL) in the same manner as the second embodiment.

In another liquid crystal display device according to the seventh embodiment shown in FIG. 24 as well, the cover electrode CE is disposed at the lower layer side of the drain line DL which is a wire via the insulating layer PAS1. At this time, a configuration of the upper layer of the drain line DL is the same as that in the liquid crystal display device shown in FIG. 23, and, in the side wall surfaces of the insulating layer PAS3, that is, the edges on the long side of the pixel PXL, the wall electrode PX formed by the wall-shaped electrode PX1 and the planar electrode PX2 is formed at one edge, and the wall electrode (common wall electrode) CT3 formed by the wall-shaped electrode CT4 and the planar electrode CT5 are formed at the other edge.

Therefore, in another liquid crystal display device according to the seventh embodiment shown in FIG. 24, in addition to the effects achieved by the liquid crystal display device according to the seventh embodiment shown in FIG. 23, it is possible to achieve a notable effect that the cover electrode CE can suppress occurrence of electric flux lines LF reaching the wall electrode PX from the drain line DL via the liquid crystal layer LC.

[Eighth Embodiment]

Figure 25:
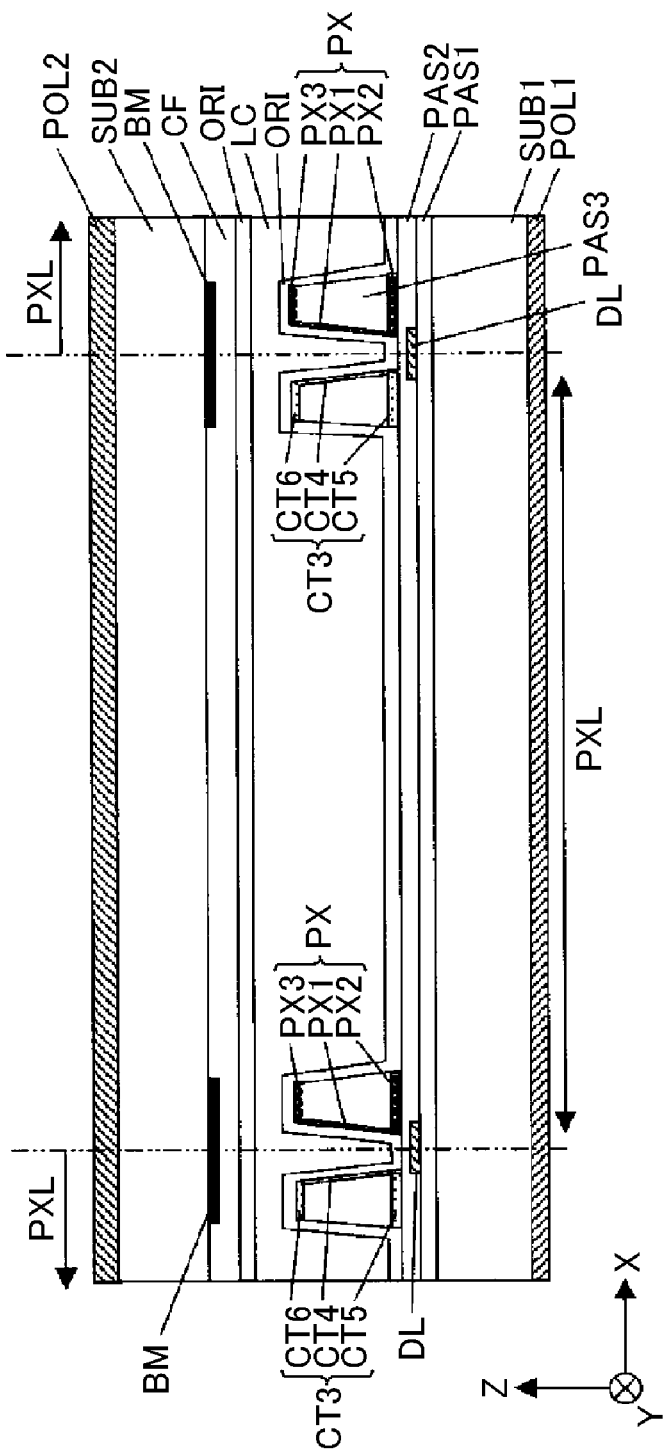
FIG. 25 is a cross-sectional view illustrating a pixel configuration in a liquid crystal display device according to an eighth embodiment of the present invention.

FIG. 25 is a cross-sectional view illustrating a pixel configuration in a liquid crystal display device according to an eighth embodiment of the present invention, and configurations other than the common wall electrode CT3 formed by a wall electrode are the same as in the third embodiment. Signals supplied to the wall electrode PX and the common wall electrode CT3 are the same as in the seventh embodiment. Therefore, in the following description, a configuration of the common wall electrode CT3 forming a common electrode will be described in detail.

As shown in FIG. 25, in the liquid crystal display device according to the eighth embodiment, the pseudo-wall electrode according to the third embodiment is not used, and a pair of wall electrodes formed along the edges in the longitudinal direction is not electrically connected to each other. In the same manner as the seventh embodiment, the wall electrode PX which is one wall electrode is electrically connected to the source electrode of the thin film transistor, and the common wall electrode CT3 which is the other wall electrode is connected to the common line. In other words, of a pair of wall electrodes formed along the edges in the longitudinal direction, one wall electrode PX is a pixel electrode, and the other wall electrode (common wall electrode) CT3 is a common electrode. In addition, the wall electrode PX and the common wall electrode CT3 of the adjacent pixel PXL are disposed so as to be close to each other with the boundary portion (indicated by the two-dot chain line) of the pixel PXL interposed therebetween.

In the pixel configuration according to the eighth having this configuration, in the same manner as the third embodiment, the insulating layers PAS3 are formed along a pair of side portions in the longitudinal direction of the side portions of the pixel PXL. Each insulating layer PAS3 has a trapezoidal shape in a cross-sectional shape on the plane in the transverse direction of the pixel PXL, and the wall-shaped electrode PX1 is formed at the side wall surface on the adjacent pixel side of one insulating layer PAS3. In addition, the planar electrode PX2 is formed at the lower surface side of the insulating layer PAS3 at which the wall-shaped electrode PX1 is formed, and the planar electrode PX3 is formed at the upper surface side thereof. At this time, the upper and lower edges of the wall-shaped electrode PX1 are consecutively connected to the planar electrodes PX2 and PX3 at the end portions thereof, and the wall-shaped electrode PX1 and the planar electrodes PX2 and PX3 form the wall electrode PX having a C shape where a cross-sectional shape of the wall electrode PX is opened in the center direction (transmissive region) of each pixel PXL, that is, the common wall electrode CT3 side.

In a similar manner, the wall-shaped electrode CT4 is formed at the side wall surface on the adjacent pixel side of the other insulating layer PAS3 of a pair of insulating layers PAS3. In addition, the planar electrode (first planar electrode) CT5 is formed at the lower surface side of the insulating layer PAS3, and the planar electrode (second planar electrode) CT6 is formed at the upper surface side. At this time, the upper and lower edges of the wall-shaped electrode CT4 are consecutively connected to the planar electrodes CT5 and CT6 at the end portions thereof, and the wall-shaped electrode CT4 and the planar electrodes CT5 and CT6 form the common wall electrode CT3 having a C shape where a cross-sectional shape of the common wall electrode CT3 is opened in the center direction (transmissive region) of each pixel PXL, that is, the wall electrode PX side.

Therefore, in the pixel configuration according to the eighth embodiment as well, in the same manner as the third embodiment, electric flux lines generated from the planar electrodes PX2 and PX3 can be rapidly bent by electric flux lines generated by the wall electrode PX. In addition, electric flux lines reaching the planar electrodes CT5 and CT6 can be also rapidly bent by electric flux lines generated from the second wall-shaped electrode CT4. Thereby, since the number of electric flux lines reaching the second wall electrode CT3 from the wall electrode PX is increased, it is possible to suppress non-uniformity of the electric field intensity and to improve the display mode efficiency in all the pixels.

In addition, in the configuration according to the eighth embodiment, it is possible to prevent (shield) electric flux lines generated from the wall-shaped electrode PX1 from heading toward the adjacent pixel or the drain line DL via the liquid crystal layer LC side by the planar electrodes PX2 and PX3, and electric flux lines generated from the planar electrodes PX2 and PX3 can reach the second wall electrode CT3. In a similar manner, in the second wall electrode CT3 as well, it is possible to prevent (shield) electric flux lines generated from the adjacent pixel or the drain line DL from reaching the wall-shaped electrode CT4 via the liquid crystal layer LC by the planar electrodes CT5 and CT6, and electric flux lines generated from the wall electrode PX can reach the planar electrodes CT5 and CT6. Therefore, in the liquid crystal device according to the eighth embodiment as well, non-uniformity of the electric field intensity in the pixel PXL can be suppressed in the same manner as the third embodiment. Further, the configuration can contribute to suppressing an increase in black transmittance due to a potential of the drain line DL or the like which is a wire. In addition, since the number of electric flux lines reaching an adjacent pixel performing black display, an increase in black transmittance of the adjacent pixel can be suppressed. From the above description, in the configuration according to the eighth embodiment, it is possible to lower the driving voltage, to improve display mode efficiency, to suppress an increase in black transmittance due to a wire potential, and to suppress an increase in black transmittance of an adjacent pixel.

In the liquid crystal display device according to the eighth embodiment as well, in the same manner as the seventh embodiment, since the wall electrode PX and the common wall electrode CT3 of each pixel PXL are disposed so as to be opposite to each other in the transverse direction, if the present invention is applied to a high definition liquid crystal display panel, it is possible to shorten (decrease) a gap between the wall electrode PX and the common wall electrode CT3. As a result, it is possible to apply a uniform electric field between the wall electrode PX and the common wall electrode CT3, and thus display mode efficiency can be improved.

In addition, since it is not necessary to form a linear electrode for forming a pseudo-wall electrode at the center portion of each pixel PXL in the first substrate SUB1 and the second substrate SUB2, it is possible to reduce the number of steps necessary for manufacturing the first substrate SUB1 and the second substrate SUB2, and thus an effect of manufacturing a liquid crystal display device at low cost can be achieved.

In the pixel configuration according to the eighth embodiment, such as, for example, the wall electrode PX being formed at the side wall surfaces of insulating layers PAS3 in odd numbered pixel boundaries in the X direction, and the common wall electrode CT3 being formed at the side wall surfaces of insulating layers PAS3 in even numbered pixel boundaries, the common electrodes or the pixel electrodes of the adjacent pixels may be collectively disposed at the insulating layers formed so as to be close to the pixel boundaries.

Figure 26:
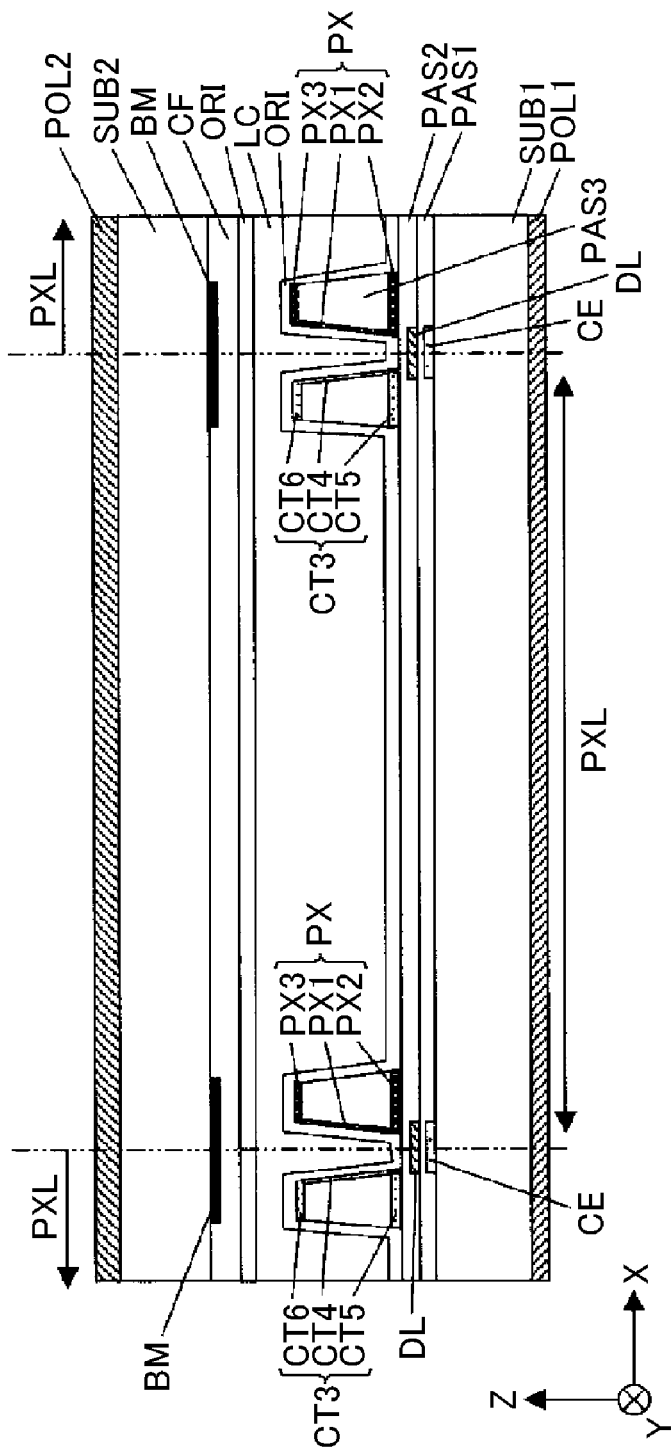
FIG. 26 is a cross-sectional view illustrating a pixel configuration in another liquid crystal display device according to the eighth embodiment of the present invention.

As shown in the cross-sectional view illustrating a pixel configuration in another liquid crystal display device of the eighth embodiment of the present invention shown in FIG. 26, the cover electrode CE may be provided at the lower layer of a wire (for example, the drain line DL) in the same manner as the second embodiment.

In another liquid crystal display device according to the eighth embodiment shown in FIG. 26 as well, the cover electrode CE is disposed at the lower layer side of the drain line DL which is a wire via the insulating layer PAS1. At this time, a configuration of the upper layer of the drain line DL is the same as that in the liquid crystal display device shown in FIG. 25, and, in the side wall surfaces of the insulating layer PAS3, that is, the edges on the long side of the pixel PXL, the wall electrode PX formed by the wall-shaped electrode PX1 and the planar electrodes PX2 and PX3 is formed at one edge, and the common wall electrode CT3 formed by the wall-shaped electrode CT4 and the planar electrodes CT5 and CT6 are formed at the other edge.

Therefore, in another liquid crystal display device according to the eighth embodiment shown in FIG. 26, in addition to the effects achieved by the liquid crystal display device according to the eighth embodiment shown in FIG. 25, it is possible to achieve a notable effect that the cover electrode CE can suppress occurrence of electric flux lines LF reaching the wall electrode PX from the drain line DL via the liquid crystal layer LC.

Figure 27:
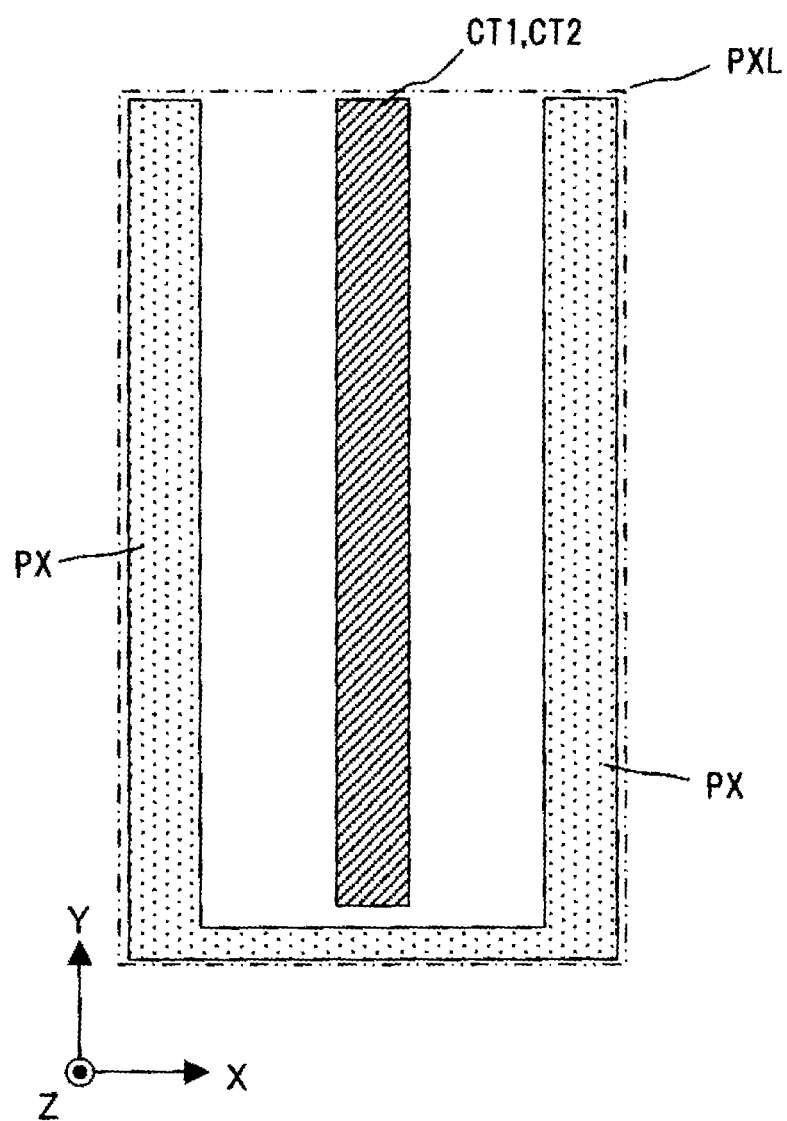
FIG. 27 is a plan view illustrating a configuration of another pixel electrode and common electrode in the liquid crystal display device according to the embodiment of the present invention.

In addition, although, in the liquid crystal display devices according to first to eighth embodiments, the wall electrode is formed along the peripheral portion of the pixel, the present invention is not limited thereto, and, for example, as shown in FIG. 27, the wall electrode may be formed as a pair of wall electrodes PX which have an opening portion in the transverse direction (X direction) of the pixel PXL, that is, extend in the longitudinal direction (Y direction) and are disposed so as to be opposite to each other in the transverse direction (X direction).

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
a first substrate provided with a plurality of first electrodes, each including a wall-shaped electrode and a planar electrode, and the first substrate further provided with a second electrode; and
a second substrate disposed so as to be opposite to the first substrate via a liquid crystal layer,
wherein regions of pixels, each having the wall-shaped electrode and the planar electrode for a pixel electrode and a corresponding part of the second electrode for a common electrode, are arranged in a matrix, and the liquid crystal layer is driven by an electric field in an in-plane direction of the first substrate, applied between each of the plurality of first electrodes and the second electrode,
wherein a step difference is formed on a side of the first substrate facing the liquid crystal layer for each of the pixel regions,
wherein the wall-shaped electrode is formed at a side wall surface of the step difference excluding an area on a top surface of the step difference and the planar electrode extends from an edge of the wall-shaped electrode along a main surface of the first substrate,
wherein the second electrode includes a linear conductive film forming a linear electrode extending along the main surface of the first substrate without connection to any electrode elevating from the linear electrode in a direction toward the liquid crystal layer,
wherein the wall-shaped electrode and the planar electrode are electrically connected to each other,
wherein a black matrix is provided above the top surface of the step difference, and
wherein the second electrode faces the liquid crystal layer via an alignment layer.

2. The liquid crystal display device according to claim 1, wherein the step difference is formed from a convex-shaped body over the adjacent pixels and is formed from an insulator,
wherein the wall-shaped electrode is formed at one side wall surface formed along at least at least an edge of the pixel of side wall surfaces of the convex-shaped body and is formed from a conductive thin film,
wherein the planar electrode is formed from a conductive thin film which extends to a corresponding pixel region from a bottom portion of the convex-shaped body along the first substrate surface, and
wherein the wall-shaped electrode and the planar electrode face the liquid crystal layer via the alignment layer.

3. The liquid crystal display device according to claim 2, wherein the wall-shaped electrode of the adjacent pixel is formed at the opposite side wall surface of the single convex-shaped body formed from the insulator.

4. The liquid crystal display device according to claim 1, wherein the step difference is formed from convex-shaped bodies formed along at least a pair of edges opposite to each other in the pixel region,
wherein the wall-shaped electrode is formed from a conductive thin film which is formed on an adjacent pixel side of the side wall surfaces of each of the convex-shaped bodies, and
wherein the planar electrode includes a first planar electrode formed from a conductive thin film which is formed along a bottom portion of the convex-shaped body, and a second planar electrode formed from a conductive thin film which is formed along a top portion of the convex-shaped body.

5. The liquid crystal display device according to claim 1, wherein the wall-shaped electrode and the planar electrode form at least a pair of edges which are opposite to each other with the pixel region interposed therebetween, of edges of the pixel region, and the second electrode is formed from the linear conductive thin film which is formed in a region between a pair of the plurality of first electrodes disposed at the edges opposite to each other in the pixel region.

6. The liquid crystal display device according to claim 5, wherein the linear conductive thin film includes a first linear electrode formed on the first substrate, and a second linear electrode which is formed on the second substrate and at least a part of which is formed so as to overlap the first linear electrode via the liquid crystal layer, and
wherein the first linear electrode and the second linear electrode are electrically connected to each other, thereby forming a same potential region.

7. The liquid crystal display device according to claim 6, wherein an electrode width of the second linear electrode is larger than an electrode width of the first linear electrode.

8. The liquid crystal display device according to claim 5, wherein the linear conductive thin film includes a first linear electrode which is formed on the first substrate along the main surface and extends in a longitudinal direction of the pixel.

9. The liquid crystal display device according to claim 1, further comprising:
a drain line formed on the side surface of the first substrate facing the liquid crystal layer and supplied with an image signal;
a gate line formed on the side of the first substrate facing the liquid crystal layer and supplied with a scanning signal;
a thin film transistor supplying the image signal to the plurality of first electrodes in synchronization with the scanning signal; and
a cover electrode disposed in an overlapping manner at a lower layer of at least one of the drain line and the gate line.

10. The liquid crystal display device according to claim 1, wherein, when an electrode width of the planar electrode extending from the edge of the wall-shaped electrode to the pixel region is L1, and a thickness of the liquid crystal layer is d, the electrode width L1 of the planar electrode is $0.5 \leq L1 \leq d$ (μm).

11. The liquid crystal display device according to claim 1, wherein an electrode width of the planar electrode extending from the edge of the wall-shaped electrode along the main surface of the first substrate is at least 0.5 μm.

12. The liquid crystal display device according to claim 1, wherein the planar electrode extending from the edge of the wall-shaped electrode along the main surface of the first substrate has an electrode width sufficient to shield electric flux lines generated from wires reaching the wall-shaped electrode so as to suppress black transmittance from being increased due to wire potential.

* * * * *